United States Patent
Yao et al.

(10) Patent No.: US 11,532,421 B2
(45) Date of Patent: Dec. 20, 2022

(54) MAGNETIC CORES WITH HIGH RELUCTANCE DIFFERENCES IN FLUX PATHS

(71) Applicant: International Business Machines Corporation, Armonk, NY (US)

(72) Inventors: Yuan Yao, Tarrytown, NY (US); Todd Edward Takken, Brewster, NY (US); Andrew Ferencz, Southborough, MA (US); Xin Zhang, Chappaqua, NY (US); Liam Daley McAuliffe, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 17/174,453

(22) Filed: Feb. 12, 2021

(65) Prior Publication Data
US 2022/0270807 A1     Aug. 25, 2022

(51) Int. Cl.
*H01F 27/26*       (2006.01)
*H02M 3/335*      (2006.01)
*H01F 41/02*      (2006.01)
*H01F 1/147*      (2006.01)
*H01F 27/28*      (2006.01)

(52) U.S. Cl.
CPC ......... *H01F 27/26* (2013.01); *H01F 1/14733* (2013.01); *H01F 27/28* (2013.01); *H01F 41/0206* (2013.01); *H02M 3/33576* (2013.01)

(58) Field of Classification Search
CPC ...... H01F 27/25; H01F 1/14733; H01F 27/28; H01F 41/0206; H01F 3/33576
See application file for complete search history.

(56) References Cited

U.S. PATENT DOCUMENTS

| 4,670,696 | A | | 6/1987 | Byrne et al. | |
|---|---|---|---|---|---|
| 5,790,005 | A | * | 8/1998 | Santi | H02M 3/005 335/296 |

(Continued)

FOREIGN PATENT DOCUMENTS

TW     201817145     5/2018

*Primary Examiner* — Adolf D Berhane
(74) *Attorney, Agent, or Firm* — Daniel P. Morris; Lou Percello, Attorney, PLLC

(57) ABSTRACT

Embodiment of the present invention includes a magnetic structure and a magnetic structure used in a direct current (DC) to DC energy converter. The magnetic structure has an E-core and a plate, with the plate positioned in contact or in near contact with the post surfaces of the E-core. The E-core has a base, a no-winding leg, a transformer leg, and an inductor leg. The no-winding leg, the transformer leg, and the inductor leg are perpendicular and magnetically in contact with the base. The plate is a flat slab with lateral dimensions generally larger than its thickness. The plate has a plate nose that overlaps a top no-winding leg surface of the no-winding leg with a no-winding gap area to form a no-winding gap with a no-winding gap reluctance. The plate also has a plate end that overlaps a top inductor leg surface of the inductor leg with an inductor gap area to form an inductor gap with an inductor gap reluctance. In some embodiments, e.g., where the duty cycle is less than 50 percent, the inductor gap reluctance will be designed to be less than the no-winding gap reluctance. In these cases, the majority of the magnetic flux that passes through the transformer leg will return through the inductor leg, instead of through the no-winding leg. The inductor and no-winding gap reluctances can he adjusted, so that the electromotive force applied to a charge passing through the inductor will partially cancel the electromotive force applied by the transformer secondary. The gap reluctance ratio can be defined, so that the difference in secondary and inductor electromotive forces is equal to the output voltage defined by an optimal no-ripple duty cycle. In this way no changing current is required through the inductor to create a dI/dt inductive voltage drop across the output inductor. Zero output current ripple is achieved.

(Continued)

Various embodiments of the plate, plate shape, and no-winding leg are disclosed. These embodiments allow achieving a high ratio of no-winding gap reluctance to inductor gap reluctance, for practical, affordable magnetic material structures and aspect ratios. A high gap reluctance ratio enables zero output current ripple for the high transformer turns ratios that are needed to achieve high input to output voltage ratios. The embodiments therefore allow achieving low output current ripple for 48 V or higher input voltages, 1 V or lower output voltages, and high output currents.

20 Claims, 12 Drawing Sheets

(56) References Cited

U.S. PATENT DOCUMENTS

| | | |
|---|---|---|
| 7,307,502 B2 | 12/2007 | Sutardja |
| 7,489,527 B2 | 2/2009 | Lee et al. |
| 8,680,739 B2 | 3/2014 | Aoyama et al. |
| 10,186,949 B1 | 1/2019 | Ferencz et al. |
| 10,474,171 B2 | 11/2019 | Williams et al. |
| 2010/0067263 A1 | 3/2010 | Qian et al. |
| 2018/0048188 A1 | 2/2018 | Karalis et al. |
| 2021/0234465 A1* | 7/2021 | Takken ................ H01L 25/16 |

* cited by examiner

MAGNETIC CORES WITH HIGH RELUCTANCE DIFFERENCES IN FLUX PATHS

STATEMENT REGARDING FEDERALLY SPONSORED RESEARCH OR DEVELOPMENT

This invention was made with Government support under contract numbers B621073 awarded by the Department of Energy (DOE) and H98230-19-C-0113 awarded by the Department of Defense (DOD). The Government has certain rights to this invention.

BACKGROUND

The present invention relates to energy converters. More specifically, the invention relates to DC-DC power converters and the magnetic/structures/cores used to reduce converter size; convert higher voltage, low current inputs to low voltage, high current outputs; reduce output ripple voltage/current; and reduce output impedance.

DC-DC power converters (converters) take a direct current (DC) voltage/current as an input and output a DC voltage/current at a different level. DC-DC power converters have the ability to provide circuitry with multiple levels of DC voltage from a single DC source. Converters also enable higher distribution voltages (at lower current, and thus lower $I^2R$ power losses) for distributing power to high current/low voltage components in large electronic systems, e.g., supercomputers. Other uses include power sources and power distribution in battery powered electronics like cell phones and laptop computers.

For example, modern high-performance computer processors and (Application-Specific Integrated Circuits) ASICs require high current at low voltage. A high-performance processor today may require anywhere from a 0.55 V to 1.1 V processor core operating voltage with peak currents exceeding 500 Amperes (A). A DC-DC converter placed close to the processor/load minimizes the distance that the high current must travel through the circuit board (or computer frame) from the converter power source to the load, e.g., processor. Several DC-DC converters may be used in parallel to deliver a higher total load current. Typical prior art current outputs per converter are from 40 A to 60 A. Large computer systems commonly use from one to eight converters in parallel.

In many applications, a 12 Volt (V) power distribution intermediate bus system delivers DC power to one or more DC-DC converters within the computer system, drawers and/or racks at an input voltage of 12 VDC. Using a higher distribution voltage (here 12 VDC) in the distribution system bus reduces the current flowing in the bus and reduces the $I^2R$ losses dissipated by the bus distribution system. The bus(es) is(are) connected to inputs of the converters which step down the voltage and provide high current to nearby system components connected as converter output loads. These designs enable smaller power distribution connections with smaller wiring cross-sections, less copper, fewer connections, etc.

These benefits can be increased by raising the operating voltage of the distribution/intermediate bus system. For example, the industry has established, through agency regulation, that voltages less than 60 V are considered safe and do not require that special provisions be made to shield people from having access to circuits with distribution voltages lower than 60 V. In the industry, a 48 VDC intermediate bus is a widely adopted solution for rack-level distribution of the intermediate bus, e.g., in telecom hardware systems. In some systems, a converter transforms the 48 VDC intermediate bus voltage to 12 VDC, so that the traditional 12 V to processor voltage DC-DC converters can still be used. Thus, the system's overall DC-DC power conversion from 48 V to processor voltage consists of multiple power conversion stages in series. Each power conversion stage takes up physical space and consumes power.

To reduce the number of power conversion stages, it is desirable to directly convert from a higher input voltage, e.g., a 48 V DC or higher intermediate voltage, to sub 1 VDC processor voltages in a single conversion step stage. Such designs would both eliminate the power loss, volume, and material cost of the separate 48 VDC to 12 VDC conversion stage and reduce the intermediate bus distribution losses, due to the 4× reduction in intermediate bus current.

When converting from a common 12 VDC input to sub 1 VDC output, some prior converters rely on switching and/or diode circuitry without the use of cores/transformers. Some of these switching technologies adjust the duty cycle of the input voltage (e.g., the percentage portion of the total cycle the switching circuits are in the "on state", e.g., energizing the primary coil 175P) to control the amount of power transferred to the load of the converter. However, when converting from higher voltage intermediate busses, e.g., in the range above 12 VDC input voltage (e.g., 48 VDC or above) to sub 1 V DC output voltages (at very high currents), switching controls in these converters have difficulty operating accurately. For example, without using transformers/cores, the switching "on time" in the 48 VDC to sub 1 VDC conversion needs to be short, i.e., the duty cycle is small. This short switch timing is difficult to control.

Some power converters use switching techniques in combination with magnetic field storage components, like inductors or transformers/cores. When the input to output voltage ratio is substantially higher than 12 (12 V/1 V), versions of these converters are more efficient, have reduced losses/heat generation, and enable better control of output voltages than converters without cores.

Further, integrating magnetics/magnetic cores in feed forward DC-DC power converters can result in devices that have low or zero output current ripple. The design and dimensions of the magnetic core(s) affect properties (e.g., internal core reluctances) of these cores that affect converter performance, e.g., low/zero output current ripple for given applications.

Therefore, to address these problems, many vendors design 48 V to sub 1 V DC-DC converters that include transformers and have the switching secondary-side Field Effect Transistors (FETs) connected between the secondary side of the transformer and the output inductor. In some embodiments, these secondary-side FETs control the duty cycle (percentage on vs. total cycle) of the power applied to the output inductor.

However, many of these core/transformer-based industry DC-DC converter designs in the prior art have separate transformers and output inductors. The magnetic cores for these transformers and inductors take up significant physical volume and make transformer-based DC-DC converters less space- and cost-efficient. The separate output inductors tend to be large.

Growing demand for DC-DC converters with higher input voltages, lower output voltages, and higher secondary currents to loads increases constraints on core/transformer design, sizing, and dimensions. As a result, the magnetic cores needed for next generation converters are becoming more and more difficult to manufacture. Also, these design constraints limit the ability of DC-DC converters to convert higher voltage inputs to lower output voltages and higher output currents at a high quality, e.g., with reduced ripple.

There is a need to improve DC-DC electrical power converters, and in particular, DC-DC power converters using magnetic cores. There is a need to provide DC-DC power converters that convert high voltage inputs to low voltage, high current outputs with low or no output current and output voltage ripple.

SUMMARY

Embodiments of the present invention include a magnetic core and a direct current (DC) to DC energy converter using the magnetic core.

The core has an E-core and a plate disposed/placed/positioned on the E-core. The E-core has a base, a no-winding leg, a transformer leg, and an inductor leg. The no-winding leg, the transformer leg, and the inductor leg are perpendicular to and electromagnetically in contact with the base and, in some embodiments, are spaced on the base with the transformer leg being between the no-winding leg and the inductor leg.

The no-winding leg is on a no-winding core end of the E-core and the inductor leg is on an inductor core end of the E-core. The base, no-winding leg, transformer leg, and inductor leg are made from a magnetic material having a high relative magnetic permeability, such as ferrite.

The plate is made from a magnetic material having a high relative magnetic permeability and is disposed/placed/positioned on the no-winding leg, transformer leg, and inductor leg on an opposite side of the legs from the base. The plate has a plate shape with one or more lateral dimensions larger than a plate thickness, with a plate nose that overlaps a top no-winding leg surface of the no-winding leg with a no-winding gap area. The plate also has a plate end that overlaps a top inductor leg surface of the inductor leg with an inductor gap area. The no-winding gap area is less than the inductor gap area.

A no-winding gap with a no-winding gap length is formed by a no-winding separation between the plate nose and the top no-winding leg surface. An inductor gap with an induction gap length is formed by an inductor separation between the plate end and the top inductor leg surface. The no-winding gap and inductor gap are filled with a nonmagnetic material.

A primary coil with a primary coil number of turns wound with a primary coil polarity encloses the transformer leg and a secondary coil with a secondary coil number of turns wound with a secondary coil polarity enclose the transformer leg. The secondary coil polarity is opposite the primary coil polarity. An inductor coil with an inductor coil number of turns wound with an inductor coil polarity encloses the inductor leg. A second end of the secondary coil is connected in a common connection to a first end of the inductor coil. The inductor coil polarity is opposite the secondary coil polarity. This means that for a common current path passing through the secondary coil connected in series with the inductor coil, for a magnetic flux loop passing through the transformer post and returning in part through the inductor post, a time rate of change of the magnetic flux in the magnetic flux loop will cause charge passing through the common current path to experience an electromotive force of one polarity when passing through the secondary coil and an electromotive force of the opposite polarity when passing through the inductor coil in the same direction of current flow. A turns ratio of the primary coil number of turns to the secondary coil number of turns is greater than 1.

A closed no-winding flux path passes through the transformer leg, the plate nose, the no-winding gap, the no-winding leg, and the base. The closed no-winding flux path has a no-winding flux path reluctance that is primarily the value of the reluctance of the no-winding gap. A closed inductor flux path passes through the transformer leg, the plate end, the inductor gap, inductor leg, and the base. The closed inductor flux path has an inductor flux path reluctance that is primarily the value of the reluctance of the inductor gap.

In some embodiments, there is a transformer gap with a transformer gap length and a transformer gap area formed by a spacing between the plate and the transformer leg. In these embodiments, that transformer gap has a transformer gap reluctance that also influences the reluctance of each of the no-winding flux path and the inductor flux path.

During operation, a net flux passing through the transformer leg is split so more flux flows through the closed inductor flux path and the inductor leg than flows through the closed no-winding flux path and the no-winding leg.

Zero output current ripple is achieved in steady state operation, when the duty cycle is adjusted, so that the output voltage delivered to the load is equal to the net electromotive force delivered to current flowing through the converter and into the load. The net electromotive force will be equal to the load voltage, if the no-winding to inductor magnetic gap reluctances are chosen, so that the difference in secondary winding and inductor winding EMF is equal to the target nominal load voltage, For converters with a high input to output voltage ratio, low duty cycles are needed. In these cases, high gap reluctance ratios are needed for zero output current ripple. Various embodiments described in this document allow high gap reluctance ratios for cost-effective, manufacturable magnetic core shapes.

Various embodiments of the plate, plate shape, and no-winding leg are disclosed. No-winding gap reluctance and inductor gap reluctance are designed to reduce output voltage/current ripple, reduce output impedance at operating parameters. Optimal turns ratios are disclosed. Duty cycles of the DC-DC converter can be adjusted to keep the output voltage less than or equal to one volt at high output currents. For a desired duty cycle and output voltage, the magnetic gap reluctances can be designed to minimize output current ripple. Methods of making the core are disclosed.

BRIEF DESCRIPTION OF THE DRAWINGS

Various embodiments of the present invention will be described below in more detail, with reference to the accompanying drawings, now briefly described. The Figures show various apparatus, structures, and related method steps of the present invention.

DETAILED DESCRIPTION

Figure 1:
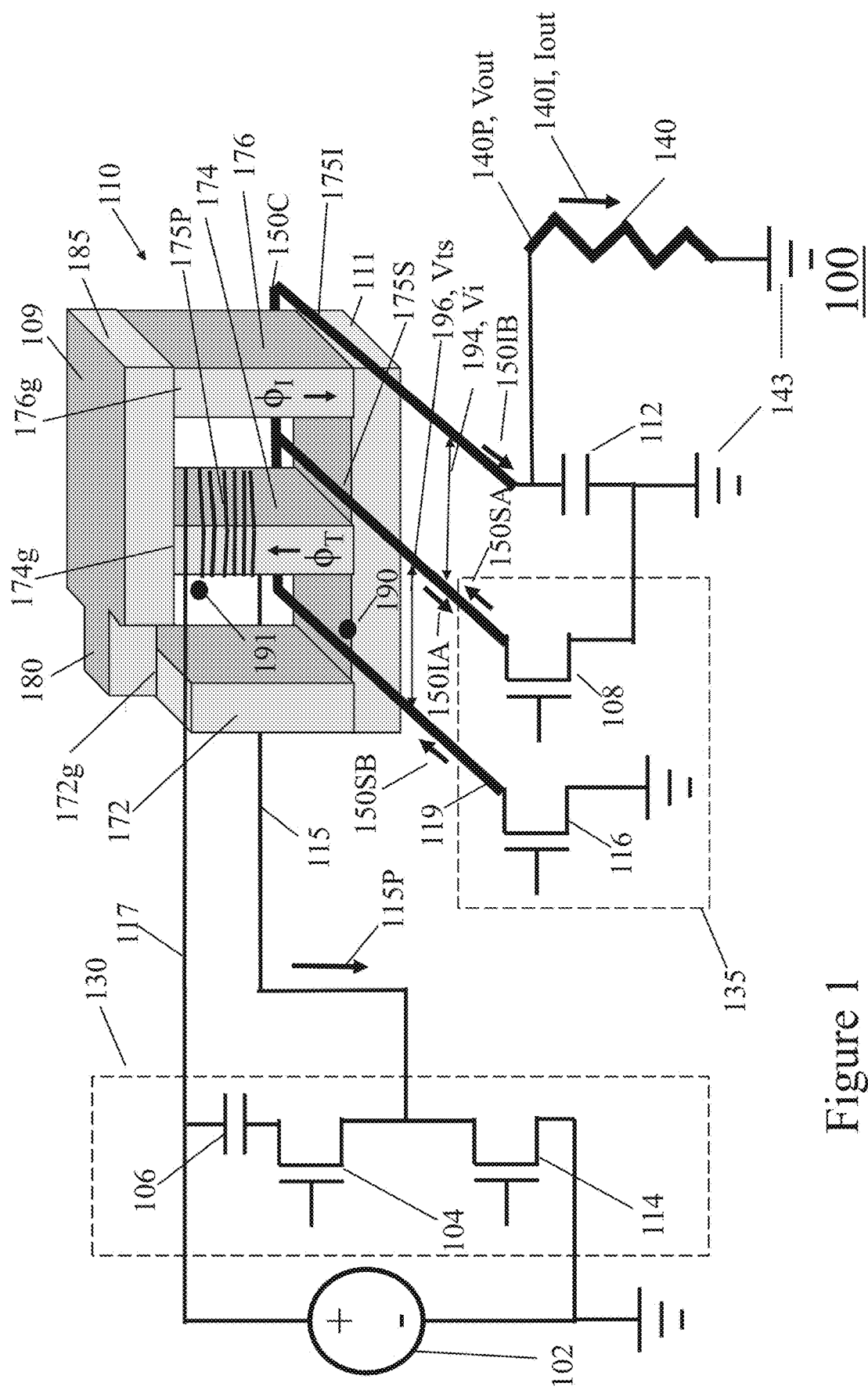
FIG. 1 is a circuit diagram of a non-limiting example of a DC-DC converter using a ferrimagnetic core (core) where the core material has a high relative magnetic permeability and low magnetic hysteresis losses.

It is to be understood that embodiments of the present invention are not limited to the illustrative methods, apparatus, structures, systems, and devices disclosed herein but instead are more broadly applicable to other alternative and broader methods, apparatus, structures, systems and devices that become evident to those skilled in the art given this disclosure.

In addition, it is to be understood that the various components, structures, and/or regions shown in the accompanying drawings are not drawn to scale, and that one or more components, structures, and/or regions of a type commonly used may not be explicitly shown in a given drawing. This does not imply that the components, structures, and/or regions not explicitly shown are omitted from the actual devices.

In addition, certain elements may be left out of a view for the sake of clarity and/or simplicity when explanations are not necessarily focused on such omitted elements. Moreover, the same or similar reference numbers used throughout the drawings are used to denote the same or similar features, elements, or structures, and thus, a detailed explanation of the same or similar features, elements, or structures will not he repeated for each of the drawings.

The devices, structures, and methods disclosed in accordance with embodiments of the present invention can he employed in applications, hardware, and/or electronic systems Suitable hardware and systems for implementing embodiments of the invention may include, but are not limited to, power supplies and/or power converters used in personal computers, communication networks, electronic commerce systems, portable communications devices, solid-state media storage devices, expert and artificial intelligence systems, functional circuitry, neural networks, telephone communication systems, etc.

As used herein, "height" refers to a vertical size of an element (e.g., a layer, trench, hole, opening, etc.) in the cross-sectional or elevation views measured from a bottom surface to a top surface of the element, and/or measured with respect to a surface on which the element is located.

Conversely, a "depth" refers to a vertical size of an element (e.g., a layer, trench, hole, opening, etc.) in the cross-sectional or elevation views measured from a top surface to a bottom surface of the element. Terms such as "thick", "thickness", "thin" or derivatives thereof may be used in place of "height" where indicated.

As used herein, "lateral," "lateral side," "side," and "lateral surface" refer to a side surface of an element (e.g., a layer, opening, etc.), such as a left or right-side surface in the drawings.

As used herein, "width" or "length" refers to a size of an element (e.g., a layer, trench, hole, opening, etc.) in the drawings measured from a side surface to an opposite surface of the element. Terms such as "thick", "thickness", "thin" or derivatives thereof may be used in place of "width" or "length" where indicated.

As used herein, terms such as "upper", "lower", "tight", "left", "vertical", "horizontal", "top", "bottom", and derivatives thereof shall relate to the disclosed structures and methods, as oriented in the drawing figures. For example, as used herein, "vertical" refers to a direction perpendicular to the top surface of the substrate in the elevation views, and "horizontal" refers to a direction parallel to the top surface of the substrate in the elevation views.

As used herein, unless otherwise specified, terms such as "on", "overlying", "atop", "on top", "positioned on" or "positioned atop" mean that a first element is present on a second element, wherein intervening elements may be present between the first element and the second element. As used herein, unless otherwise specified, the term "directly" used in connection with the terms "on", "overlying", "atop", "on top", "positioned on" or "positioned atop," "disposed on," or the terms "in contact" or "direct contact" means that a first element and a second element are connected without any intervening elements, such as, for example, intermediary conducting, insulating or semiconductor layers, present between the first element and the second element.

It is understood that the meaning of terms might be affected by the orientation of the device described. For example, while the meaning of these descriptions might change if the device was rotated upside down, the descriptions remain valid because they describe relative relationships between features of the invention.

Integrated magnetics in feed forward DC-DC power converters can be used to create devices having low or zero output current ripple. As discuss in more detail below, to achieve the low or zero output current ripple, the differences in reluctances within the core, e.g., the ratio of reluctances in core legs/posts, are designed so that ripple is reduced. In some embodiments, the core transformer leg turns ratio is increased to gain efficiency. Duty cycles are designed to enable these lower, more efficient turns ratios. The core reluctances (e.g., ratios) are modified in various ways/embodiments, e.g., with multiple gap designs, to split flux within the core to enable zero or little output voltage/current ripple at (or near) design operating points and enable a smaller size output inductor that is integrated with the core and has a lower output impedance.

Referring now to the Figures.

FIG. 1 is a circuit diagram of a non-limiting example of a DC-DC converter 100 using a magnetic core (core) 110.

The core is constructed from a material having a relative magnetic permeability substantially larger than one.

As shown in FIG. 1, a magnetic core 110, e.g., a core structure 110, has three core legs: a transformer leg 174, an inductor leg 176, and a no-winding leg 172. The magnetic core 110 also has a base 111 and a top or plate 109. In some embodiments, a primary coil 175P and a secondary coil 175S enclose the transformer leg 174. The primary coil 175P has a primary coil number of turns, Np, and the secondary coil 175S has a secondary coil number of turns, Ns. The turns ratio is Np/Ns.

Alternatively, the core 110 can be viewed as having an E-core and a plate 109. The E-core 111/172/174/176/ is made of the no-winding leg 172, the transformer leg 174, the inductor leg 176, and the base 111. The no-winding leg 172, the transformer leg 174, and the inductor leg 176 are perpendicular and electromagnetically in contact with the base 111 and (in some embodiments) are spaced on the base 111 with the transformer leg 174 being between the no-winding leg 172 and the inductor leg 176. The term "electromagnetically in contact" means the flux paths as described below are formed. The no-winding leg 172 is on a no-winding core end 180 of the core 110 and the inductor leg 176 is on an inductor core end 185 of the core 110. The plate 109 has a plate shape and, in some embodiments, the plate shape has a narrower width at the no-winding core end 180 than at the inductor core end 185. The plate 109 is disposed or positioned on the no-winding 172, transformer 174, and inductor 176 legs on an opposite side of the legs from the base 111.

The no-winding leg 172 has a no-winding top post end 172T (see FIG. 2), the transformer leg 174 has a transformer top post end 174T, and the inductor leg 176 has an inductor top post end 176T. The no-winding top post end 172T, the transformer top post end 174T, and the inductor top post end 176T are opposite the base 111, i.e., base 111 is in magnetic contact with the ends of the no-winding 172, transformer 174, and inductor 176 legs that are at an opposite end from the top post ends of the respective legs 172/174/176. The plate 109 is positioned/place adjacent to the no-winding leg top post end 172T, transformer leg top post end 174T, and inductor leg top post end 176T.

The primary coil 175P turns are wound around the transformer leg 174 in a primary direction, resulting in a primary coil 175P polarity 191. The secondary coil 175S is wound around the transformer leg 174 in a secondary direction, resulting in a secondary coil 175S polarity 190.

An (output) inductor 175I encloses the inductor leg 176 with an inductor direction with an inductor coil polarity that is the same as the secondary coil 175S polarity 190.

Since the inductor 175I and secondary 175S coil each have a lower number of turns than the primary coil 175P, the inductor 175I and secondary coil 175S carry higher current and are made of a higher gauge conductor than the primary coil 175P.

The core 110 including the transformer leg 174, inductor leg 176, no-winding leg 172, base 111, and plate 109 are made of known ferromagnetic material such as iron, nickel, cobalt and/or their alloys. These materials all have a high relative magnetic permeability, $\mu_r$. Gaps 172g, 174g, and 176g, defined in more detail below, are separations between the plate 109 and the respective no-winding leg 172, transformer leg 174, and inductor leg 176. In some embodiments, the gaps 172g/174g/176g, are filled with air. In alternative embodiments, the gaps 172g/174g/176g are filled with a non-ferromagnetic material like a polymer, polymer spheres mixed in an epoxy, plastic, paper, glue, tape, and non-ferromagnetic metals. A no-winding gap 172g has a no-winding separation and an inductor gap 176g has an inductor separation. An optional transformer gap 174g has a transformer separation.

The gaps 172g/174g, 176g each have a gap length and a gap overlap area (or gap area), respectively, that are adjusted in various embodiments to obtain designed reluctance ratios in the legs. In some embodiments, the transformer leg 174 gap 174g is optional, e.g., there is no (or very small) transformer leg 174 gap 174g and the transformer leg 174 is in (or almost in) direct magnetic contact with the plate 109.

By combining the converter's 100 transformer leg 174 and inductor magnetic core leg (inductor leg) 176 into a single structure 110, correctly defining the transformer secondary 175S and inductor 175I winding polarities 190, implementing switching protocols, and enabling precise flux splitting mechanisms in the core, the value of required inductance of the inductor 175I is reduced and the output impedance of the converter 100 and output inductor 175I inductance are reduced as well.

The converter 100 has an input switching circuit 130 that switches a DC source input voltage 102 to provide a switched. DC input current 115P through the primary coil 175P during the "on" or main portion of the duty cycle. Non-limiting examples of input switching circuit 130 include input switching transistors 104 and 114 and a reset capacitor 106. Input switching transistors 104/114 can be known metal oxide semiconductor field effect transistors (MOSFETs). The switched DC input primary current 115P has an input duty cycle controlled by input switching transistors 104/114. Accordingly, external switching circuitry (not shown) controls the gates of the input switching transistors 104/114 in a way defined by a duty cycle, e.g., a primary duty cycle. The duty cycle is the percentage amount of time that the primary coil 175P is energized by the VDC source input voltage 102, e.g., from the system bus, divided by the total time of a full ON/OFF cycle. In other words, the duty cycle is the percent of the total ON/OFF cycle that the primary coil 175P is ON (or energized by the input voltage 102).

The converter 100 has an output switching circuit 135 that switches a secondary current 150SA/150SB induced in and flowing through the secondary coil 175S. in a non-limiting example, the output switching circuit 135 has secondary switching transistors 108 and 116. Secondary switching transistor 116 connects a first leg of the secondary coil 175S to ground. Secondary switching transistor 108 connects one leg of the inductor 174I, in common with a second leg of the secondary coil 175S to ground. The output switching transistors 108/116 can also be MOSFETs (controlled by the external switching circuitry, not shown) that switch secondary currents with a secondary duty cycle. In some embodiments, the primary duty cycle and secondary duty cycle match and are cotemporaneous.

As stated, the relative timing and resulting duty cycles switched by the input switching circuit 130 and output switching circuit 135 are such that both the primary switching transistors 104/114 and the secondary switching transistors 108/116, respectively, are turned on and off concurrently and with the proper relative polarities, so that resonant energy storage in the transformer core is avoided. In other words, the primary duty cycle and the secondary duty cycle are the same and synchronized in phase. Accordingly, the volume of the unified magnetic core 110 can be small/minimized since little or no resonant energy storage in the core 110 is needed. Other switch timing sequences are envisioned.

In some embodiments, the secondary switching transistor 108, output/filtering capacitor 112, and the load 140 are connected to a common ground 143. However, it is understood that grounding connections, e.g., to secondary switching transistor 116 and/or to input switching circuit 130, etc., can be common or separate ground connections as determined by known and standard grounding practices without loss of generality.

The output inductor 175I and output/filtering capacitor 112 act as a low pass filter that "smooths" ripple in the load voltage 140P and load current 140I across/through the load 140, e.g., processor(s) 140.

During an "on" or main portion of the operational cycle (the "on" state), the transistor 114 turns "on" while transistor 104 is "off". During this main part of the cycle, current from the DC voltage source/input, Vin, 102 provides the switched DC input current 115P through connections 117, the primary coil 175P, the connector 115, and the switched "on" input transistor 114 to ground. Since the DC input current 115P varies as a transient, e.g., due to the inductance of the primary coil 175P and the capacitance of the reset capacitor 106, a changing flux, $\phi p$, is induced in the transformer leg 174. The direction of the net transformer leg 174 flux, $\phi_T$, depends on the polarity 191/190, of the primary coil 175P and secondary coil 175S, e.g., how the primary coil 175P and secondary coil 175S are wound. (The net transformer leg 174 flux, $\phi_T$, is the result of the changing flux due to the primary coil 175P current, $\phi p$, together with a flux, $\phi_{ts}$, induced in the secondary coil 175S.)

Concurrently, during the "on" or main part of the cycle, secondary switching circulator transistor 108 is off while secondary switching main transistor 116 is on. By Faraday's Law, the changing net transformer leg 174 flux, $\phi_T$ causes a transformer secondary voltage, Vts, 196 between conductors 175S and 119 (which is now at ground 143 potential since secondary main transistor 116 is on).

As discussed in more detail below, the net transformer leg 174 flux, $\phi_T$, is split resulting in an inductor leg 176 flux, $\phi_I$, flowing through the inductor leg 176. The changing inductor leg 176 flux, $\phi_I$, induces an output inductor voltage 194 between conductors 175I and 175S.

Even though the secondary coil 175S is wound around the transformer leg 174 with the same polarity in rectangular coordinate space as the output inductor 175I is wound around the inductor leg 176, the secondary coil polarity is opposite the transformer coil polarity, relative to the direction of magnetic flux. The net transformer leg 174 flux, $\phi_T$, is in an opposite direction than the inductor leg 176 flux, $\phi_I$, due to the core 110 geometry. Accordingly, the transformer secondary voltage, Vts, 196 and the output inductor voltage 194 are opposed and the load voltage 140P is the difference between the transformer secondary voltage, Vts, 196 and the output inductor voltage, Vi, 194.

The transformer secondary voltage, Vts, 196 causes a secondary current 150SB/150IB through the secondary switching transistor 116, conductor 150C, filtering capacitor 112, and load 140. Note that an opposition current 150IA is caused by output inductor voltage, Vi, 194 and that current 150IB flowing through the output/filter capacitor 112 and load 140 is a resulting output current 140I that is the sum of currents 150IA and 150SA.

It is noted that FIG. 1 shows currents 150IA and 150SA in conductor 175S for clarity. However, since secondary circulator transistor 108 is off during the main or "on" part of the operational cycle, currents 150IA and 150SA actually oppose and cancel one another in conductor 150C during the main part of the operational cycle.

During the "off," reset or circulator part of the operational cycle, input primary main switching transistor 114 turns "off", input primary reset switching transistor 104 turns "on", secondary main switching transistor 116 turns off, and secondary circulator switching transistor 108 turns "on". Accordingly, the switched current 115P from the DC source 102 is switched off, the primary coil 175P current and induced flux in the transformer leg 174 ends, and current 150SB stops flowing. Here we are generally neglecting known transient effects of switching off currents through inductors, other than to say the following: input switching transistor 104 connects primary coil 175P across the reset capacitor 106 so the reset capacitor 106 charges as the transformer leg 174 flux, $\phi_T$, declines/changes; a diode (or similar circuitry, not shown) prevents any reverse flow through secondary switching transistor 116; and any load current 140I flow through the load 140 will be dominated by current 150IA/150IB due to the changing inductor leg 176 flux, $\phi_I$, through the output inductor 175I.

"D" is defined as the on-duty cycle, the percent of the total cycle that primary coil 175P is energized by the input voltage, Vin 102.

The transformer secondary voltage, Vts, 196 is equal to the input voltage 102 or the primary voltage source 102, Vin 102, divided by the transformer turns ratio, Np/Ns or Vts=Ns/Np*Vin.

During the on portion of the operational cycle, the load voltage 140P, Vout, is the transformer secondary voltage, Vts, 196 minus the inductor voltage, Vi, 194, or Vout=Vts−Vi.

[(EMF across transformer secondary during main part of cycle) 196−(EMF across inductor during main part of cycle) 194+($L$*dI/dt across the inductor)=output voltage across the load 140P].

During the on portion of the operational cycle, this also means:

Vout=Vts−Vts ($\phi_I/\phi_T$)+$L$*dI/dt

Vout=Vts (1−$\phi_I/\phi_T$)+$L$*dI/dt

[(EMF secondary)−(EMF secondary)*(flux through output inductor/(total flux)+($L$*dI/dt across the output inductor 175I)=(output voltage).

Hence, (EMF secondary)*[1−(inductor flux)/(total flux)]+($L$*dI/dt across the output inductor)= (output voltage, Vout 140P)].

If the magnetic gap reluctances are chosen such that Vts (1−$\phi_I/\phi_T$) is equal to the desired Vout, then one can see from the equation that when Vout=Vts (1−$\phi_I/\phi_T$), the term L*dI/dt must equal zero. There is zero output inductor current ripple, when the net EMF applied to the charge passing through the converter is equal to the output voltage, Vout=Vts (1−$\phi_I/\phi_T$). For one designed, nominal output voltage, Vout 140P, and for steady state operation, such zero current ripple operation can be achieved.

Therefore, under these zero current ripple conditions, during the on or main portion of the operational cycle, Vout/Vts=(1−$\phi_I/\phi_T$)

[1−(inductor flux)/(total flux)=(output voltage)/(EMF secondary)]

When the duty cycle is set to deliver an output Vout to the load which is higher or lower than Vts (1−$\phi_I/\phi_T$), the net EMF applied to current sourced by the converter, then there does exist some finite voltage L*dI/dt across the output inductor coil. This causes nonzero output current ripple. However, the magnitude remains much lower than for converter designs using similar core volume with no magnetic coupling between the transformer and inductor.

Stated another way, when the EMF, Vts 196, causing current around the transformer secondary loop 150SB to 150IA plus the opposite polarity EMF, Vi 194, causing current around the inductor loop 1505A to 1501B equals the output voltage Vout, then no inductive L*dI/dt voltage drop is needed across the inductor to make Kirchoff's current law hold true. The sum of all voltages around a current loop equals zero, when dI/dt through the inductor is zero. If the duty cycle is adjusted to provide an on output voltage Vout that is equal to the net EMF [Vts−Vts ($\phi_I/\phi_T$)=Vts (1−$\phi_I/\phi_T$)] provided by the designed reluctance ratio between the no-windings and inductor magnetic gaps, then this zero current ripple situation will hold. Thus, for a given, fixed turns ratio, reluctance ratio, etc. the condition Vout=Vts (1−$\phi_I/\phi_T$) can also be obtained by adjusting the duty cycle to adjust Vout to meet this condition and therefore achieve zero or near zero output current ripple.

One design goal is to convert an input voltage, Vin 102, equal or greater than 12 VDC, e.g., in the range of 48 VDC to 60 VDC, to an output voltage, Vout 140P, equal to 1 VDC or less. This can be accomplished by using a relatively high turns ratio (e.g., Np/Ns greater than or equal to 1/12) and/or a small duty cycle, D. Achieving zero current ripple with a small duty cycle D will require a large no-windings to inductor gap reluctance ratio.

For example, designing for an input voltage, Vin 102, of 48 VDC and an output voltage, Vout 140P, of 1 VDC, a 12:1 turns ration (Np/Ns=12) results in a Vts of 48/12=4 VDC. Achieving a 1 V output requires a duty cycle of (VDC/Vin) or 25%. For a 4:1 turns ratio the duty cycle would need to be 6.25%.

Output voltage=(duty cycle)*(input voltage)/(turns ratio)

Zero ripple output voltage=(secondary EMF magnitude)−(inductor EMF magnitude)

=(secondary EMF)−(inductor flux/total flux)*(secondary EMF)

=(secondary EMF)*[1−(inductor flux/total flux)]

=[(input voltage)/(turns ratio)]*[1−(inductor flux/total flux)]

Figure 3:
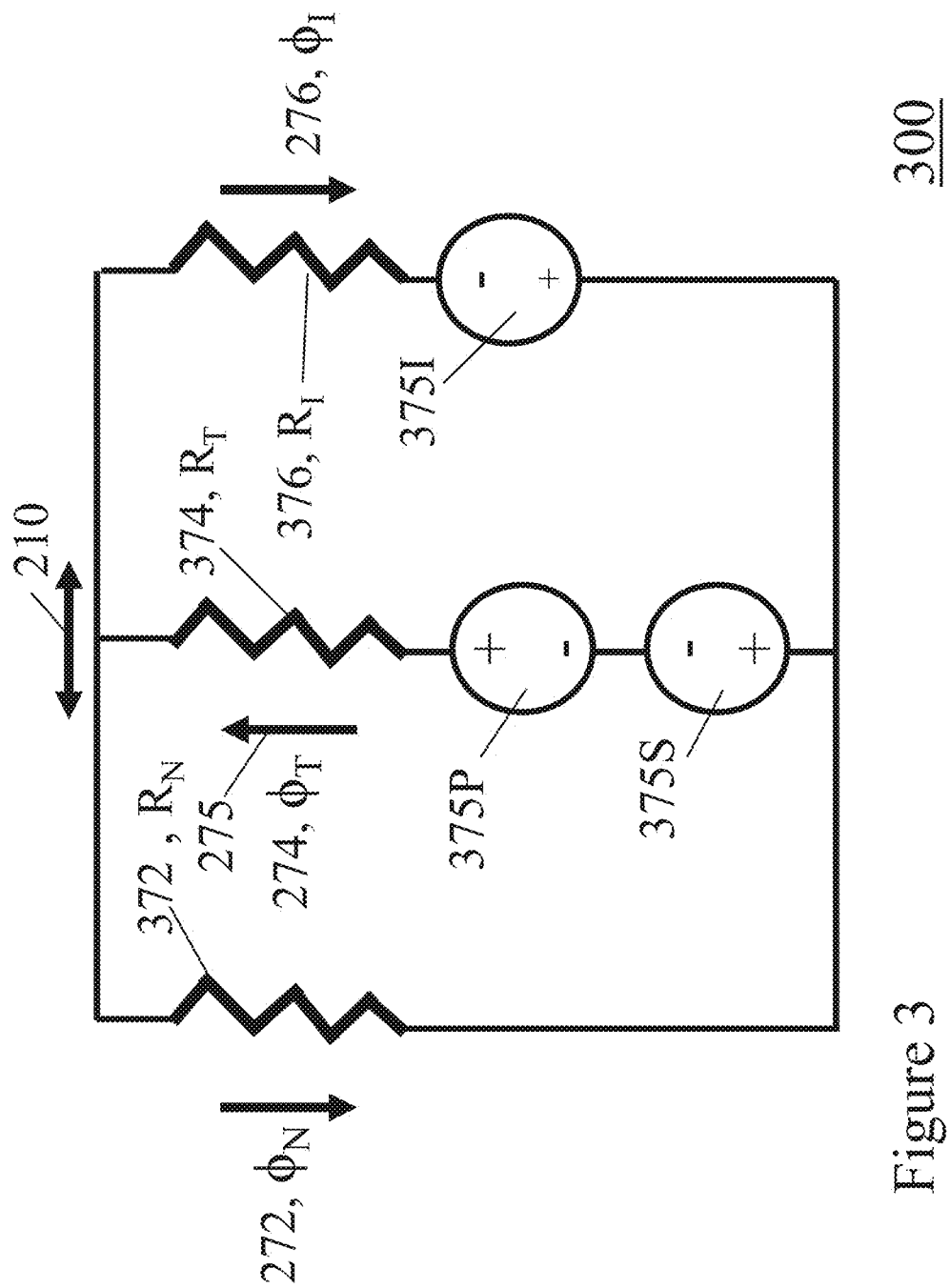
FIG. 3 is a magnetic circuit diagram of the reluctances, fluxes, and magnetomotive forces (MMFs) in the core.

To adjust the duty cycle to get zero output current ripple, then set these two equal, as follows:

(duty cycle)*(input voltage)/(turns ratio)=[(input voltage)/(turns ratio)]*[1−(inductor flux/total flux)]

duty cycle=1−(inductor flux/total flux)=1−(total reluctance)/(reluctance of inductor gap)

duty cycle=1−[Rind*Rnw/Rind+Rnw)]/Rind=1−Rnw/(Rind+Rnw)

duty cycle=Rind/(Rind+Rnw)=$R_I/(R_N+R_I)$.

Where Rnw is the reluctance through a no winding flux path, $R_N$ 372, and Rind is the reluctance through the inductor flux path, $R_I$ 376. Refer to FIG. 3 description. Note that the reluctance of the gap in these respective flux paths 372/376 makes up the predominant part of the total flux path reluctance.

Hence, for low duty cycles, high magnetic gap reluctance ratios, i.e., high values of $R_N/R_I$, will be required, in order to achieve zero output current ripple. It is not practical to make a no-winding path with high reluctance, $R_N$, by making a no-windings post very narrow in both lateral dimensions, with an extreme aspect ratio like a Manhattan sky scraper. The high aspect ratio (no-winding) post will stick and will break off inside the E-core mold. The present invention solves this problem by providing a gap reluctance ratio, thus a high value of $R_N/R_I$, that can provide zero output current ripple. The invention will become especially useful as converter sizes and E-core post sizes shrink to make more compact computing systems.

It is found that using transformers with higher turns ratio, e.g., where Np/Ns=12or more, is inefficient in highly interleaved, low leakage inductance, planar circuit board transformers, because the primary windings 175P require too many circuit board copper layers, while the secondary and inductor windings 175S and 175I must be interleaved with heavy copper. Lower turns ratios could be desirable in some cases, if the higher zero-ripple magnetic gap ratio could be affordably manufactured.

To make the converter more economically practical, a higher turns ratio, e.g., on the order of Ns/Np=¼ (or Np/Ns=4), is optimal. However, as now described, the selection of higher turns ratio transformers creates other design problems for the core design.

The table below illustrates non-limiting designs of cores 110 with high input voltages, Vin 102; low output voltages 140P; high output currents, Iout 140I; and low inductor 175I impedance. The table gives the flux split or flux ratio, the inductor leg 176 flux, $\phi_I$, divided by the net transformer leg 174 flux, $\phi_T$, or $\phi_I/\phi_T$, selected Vin 102, Vout 140P, turns ratio Np/Ns, and duty cycle, D.

| Vin, 102 VDC | Vout, 140P VDC | Np/Ns Ratio | Duty Cycle, % of cycle, primary is "On" | $\phi_I/\phi_T$ % |
|---|---|---|---|---|
| 48 | 0.9 | 24:1 | 24 * 0.9/48 = 45% | 55% |
| 54 | 0.74 | 12:1 | 12 * 0.74/54 = 16.4% | 83.6% |
| 54 | 0.75 | 4:1 | 4 * 0.75/54 = 5.6% | 94.4% |
| 54 | 1.8 | 4:1 | 4 * 1.8/54 = 13.3% | 86.6% |
| 54 | 1.2 | 4:1 | 4 * 1.2/54 = 8.9% | 91.1% |
| 54 | 0.55 | 4:1 | 4 * 0.55/54 = 4.1% | 95.9% |

Accordingly, the design range for the duty cycle is on the order of 3% to 50% and the more specifically between 5% and 20%. However, the flux ratios, $\phi_I/\phi_T$, for these design ranges are above 80% or even above 90%, e.g., 96%. In some embodiments, the flux ratio, $\phi_I/\phi_T$, of the amount of an inductor flux, $\phi_I$, flowing through the inductor leg to the amount of transformer flux, $\phi_T$, flowing through the transformer leg is greater than 55%.

Figure 2:
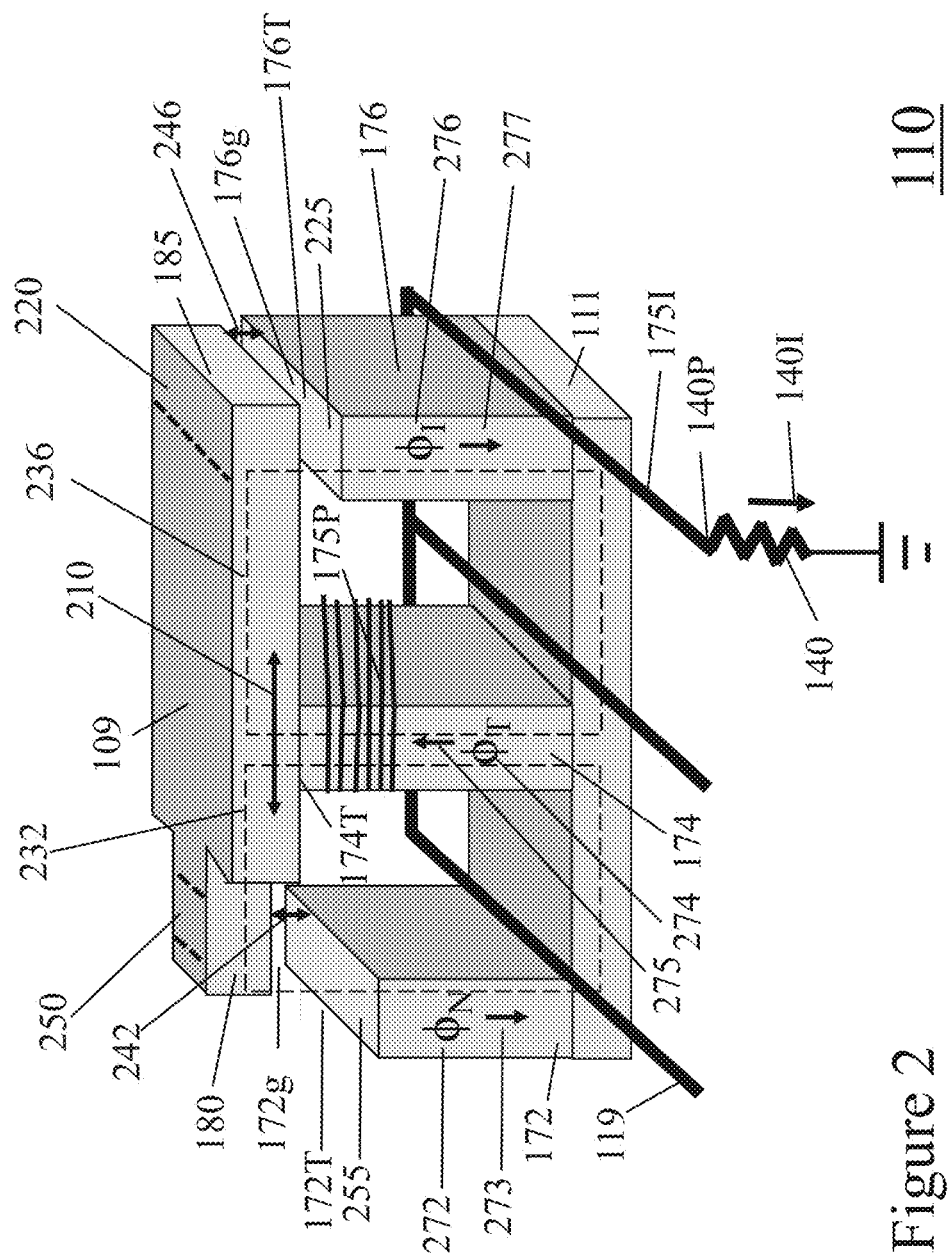
FIG. 2 is an isometric diagram of one embodiment of a core showing flux paths and gaps with gap lengths and gap areas.

FIG. 2 is an isometric diagram of one embodiment of a core 110 showing flux paths 232/236 and gaps 172g/176g, with each gap 172g/176g having a gap length 242/246, and gap overlap area or gap area 220/250. In this view there is no transformer leg gap 174g but a transformer leg gap 174g could be included optionally.

The no-winding flux path 232 is a closed path containing no winding flux, $\phi_N$, 272 as the no winding flux $\phi_N$ 272 moves through the no-winding leg 172 in no-winding flux 272 direction 273. In the no-winding flux path 232 there is a no-winding gap 172g with a no-winding gap length 242. The no-winding gap 172g has a no-winding gap area 250 defined by the vertical projection 250 of the no-winding core end 180 on the top surface 255 of the no-winding leg 172. Without loss of generality, for this discussion, the no-winding flux path 232 is considered to intersect the no-winding gap area 250 at a perpendicular angle.

The no-winding gap 172g can be filled with air with a relative magnetic permeability, $\mu_r$, of 1. Alternatively, the no-winding gap 172g can be filled with materials, e.g., a polymer or polymer balls mixed with epoxy, that have a low relative magnetic permeability, $\mu_r$, close to 1. Other materials that can fill the no-winding gap 172g (and/or the inductor gap 176g) include: a polymer mixed with an epoxy, plastic, paper, glue, tape, and non-ferromagnetic metals.

It is noted that the relative magnetic permeability, $\mu_r$, of the ferromagnetic parts, e.g., in the no-winding path 232, of the core 110, is very high, e.g., on the order of thousands of times the relative magnetic permeability of air. As discussed in more detail in FIG. 3, this causes the no-winding gap 172g to have a much higher reluctance, R, than the remainder of the no-winding path 232 and therefore the no-winding gap reluctance is the primary/highest contribution to the total reluctance, $R_N$, around the no-winding path 232.

The inductor flux path 236 is a closed path containing inductor flux, $\phi_I$, 276 as the inductor flux $\phi_I$ 276 moves through the inductor leg 176 in an inductor flux 276 direction 277. In the inductor flux path 236, there is an inductor gap 176g with an inductor gap length 246. The inductor gap 176g has an inductor gap area 220 defined by the vertical projection 220 of the inductor leg 176 top surface 225 on the plate end 185. The inductor flux path 236 is considered to intersect the inductor gap area 220 at a perpendicular angle.

As before, the inductor gap 176g can be filled with air or a low relative magnetic permeability, $\mu_r$, material. The inductor gap 176g has a much higher reluctance than the remainder of the inductor path 236 and therefore the inductor gap 176 reluctance has the highest/primary contribution to the total reluctance, $R_I$, around the no-winding path 232.

As explained in more detail in FIG. 3, the resultant transformer leg 174 flux 274, $\phi_T$, has a transformer leg 174 flux 274 direction 275 which splits 210 in the plate 109. Part of the net transformer leg 174 flux 274 splits into the inductor leg 176 flux, $\phi_I$, which flows around the inductor flux path 236 and through the inductor leg 176. The other part of the net transformer leg 174 flux 274 splits into the no-winding leg 172 flux 272, $\phi_N$, which flows around the no-winding flux path 232 and through the no-winding leg 172.

How the net transformer leg 174 flux 274, $\phi_T$, split 210 is determined by the respective total reluctance, $R_N$ and $R_I$, around each of the no-winding flux path 232 and the inductor flux path 236. The total reluctance around each of the no-winding flux path 232 and the inductor flux path 236 is primarily determined by the reluctance of the respective reluctance of the air gaps 172g and 176g in each of the flux paths 232/236. In other words, the ratio of ($\phi_I/\phi_T$) can be defined by reluctances (or ratio of reluctances) of air gaps 172g and 176g.

FIG. 3 is a magnetic circuit diagram 300 of the reluctances 372/374/376, fluxes 272/274/276, and magnetomotive forces (MMFs) 375P/375S/375I in the core 110.

The transformer leg 174 has a net flux 274, $\phi_T$, that splits 210 in the plate 109 into the no-winding leg 172 flux 272, $\phi_N$, and the inductor leg 176 flux, $\phi_I$. The transformer leg 174 has a transformer leg 174 reluctance, $R_T$, 374. In this embodiment, with no transformer leg 174 gap 174g, the transformer leg 174 reluctance, $R_T$, 374 has a relatively low value.

There are two MMFs in the transformer leg 174. The first is a primary MMF 375 created and existing in the ON part of the duty cycle, D, by the number of turns, Np, in the primary coil 175P and the current 115P. The primary MMF 375P induces a primary transformer flux (not shown) to flow in the transformer leg 174 in direction 275 during the duty cycle, D. The second MMF 375S in the transformer leg 174 is the secondary MMF 375S. The secondary MMF 375S exists during both the ON and the OFF parts of the duty cycle but can only cause secondary current to flow during the ON part of the cycle, when secondary main FET 116 is ON and permits secondary current to flow. The secondary MMF 375S is created by the secondary current 150SB/150IB flowing in the number of secondary coil 175I turns, Ns, typically 1 turn. The primary MMF 375P and the secondary MMF 375S are in opposite directions. The resulting MMF in the transformer leg 174 causes the net transformer leg 174 flux, $\phi_T$, 274 in the transformer leg flux direction 274. The net transformer leg 174 flux 274 is the result of the combination of the flux created by the primary coil 175P and the flux created by the secondary coil 175I which are in opposite directions from one another.

The inductor leg 176 has an inductor leg reluctance $R_I$ 376, an inductor leg 176 flux, $\phi_I$ 276, and an inductor MMF 375I. The inductor leg 176 flux, $\phi_I$ 276 is equal to the amount of the inductor leg 176 flux, $\phi_I$ 274 that splits 210 and flows in the inductor flux path 236. The inductor leg reluctance 376, $R_I$, is determined primarily by the reluctance of the inductor gap 176g, $R_{Ig}$. The reluctance, $R_{Ig}$, of the inductor gap 176g will be approximately equal to the reluctance, $R_I$, 376 in the entire inductor leg 176 because the relative magnetic permeability, $\mu_r$, of the inductor gap 176g is much larger than the relative magnetic permeability, $\mu_r$, of the materials making the rest of the inductor leg 176. In addition, since the transformer leg 174 has no air gap 174g in this embodiment, the inductor gap 176g reluctance, $R_{Ig}$, will be approximately equal to the entire reluctance, $R_I$, in the inductor flux path 236. (Embodiments with the transformer leg 174 having an air gap 174g can be analyzed using known techniques.) For the purposes of this explanation, and without loss of generality, the inductor gap 176g reluctance, $R_{Ig}$, the inductor leg reluctance 376, $R_I$, and the reluctance of the inductor flux path 236 will be considered equal and will be referred to interchangeably.

The inductor MMF 375I is created and exists during the duty cycle by current 150IA/150IB flowing through the turns of inductor 175I. As explained above, currents 150IA/150SA and voltages Vi 194 and Vts 196 are in opposition and when they cancel each other out, there is no ripple in Vout 140P.

As stated, the no-winding leg 172 has no-winding leg 172 flux 272, $\phi_N$, which flows around the no-winding flux path 232 and through the no-winding leg 172. The no-winding leg 172 has a no-winding leg 172 gap 172g. For the same reason as in the inductor leg 176 case, the no-winding gap 172g reluctance, $R_{Ng}$, the no-winding leg reluctance 372, $R_N$, and the reluctance of the no-winding flux path 232 will be considered equal and be referred to interchangeably, without loss of generality. There is no MMF in the no-winding leg 172 because the no-winding leg 172 is not enclosed by a coil.

Accordingly, how the net inductor leg 176 flux, $\phi_I$ 276 is split 210 into the inductor leg 176 flux, $\phi_I$ 276, and the no-winding leg 172 flux 272, $\phi_N$, is determined by the values of the inductor gap 176g reluctance, $R_{Ig}$, and the no-winding gap 172g reluctance, $R_{Ng}$.

Specifically, the no-winding leg 172 flux 272, $\phi_N$, is $\phi_N = R_{Ig}/(R_{Ig}+R_{Ng})$, and the inductor leg 176 flux, $\phi_I$ 276, is $\phi_I = R_{Ng}/(R_{Ig}+R_{Ng})$, and the flux split ratio $\phi_I/\phi_N$, is $\phi_I/\phi_N = R_{Ng}/R_{Ig}$.

In other words, the flux split 210 defined by the ratio $\phi_I/\phi_N$ is (inversely) proportional to the ratio of the reluctances, $R_{Ng}$ and $R_{Ig}$, of the inductor gap 176g and the no-winding leg 172 gap 172g (no-winding gap 172g), respectively.

Inspection of the table above indicates that the flux ratio, $\phi_I/\phi_T$, needs to be above 80% or 90%, e.g., 96% in some cases. This means, the flux split ratio, $\phi_I/\phi_N$, needs to be between 5 and 25 or 30. In other words, a preferred no-winding gap 172g reluctance, $R_{Ng}$, is between 5 and 30 times as large as the inductor gap reluctance, $R_{Ig}$.

The standard definition of reluctance, R, e.g., for a gap, is $R = 1/\mu_o A$, where $\mu_o$, is the magnetic permeability of the material in the gap, here assuming air or a material with a similar magnetic permeability;

1, is the gap length, e.g., for the no-winding gap 172g, the no-winding gap length 242; and for the inductor gap 176g, the inductor gap length 246; and A is the overlap or gap area, e.g., for the no-winding gap 172g, the no-winding gap area 250, and for the inductor gap 176g, the inductor gap area 220.

Therefore, to increase the flux split 210 to favor the inductor leg flux, $\phi_I$, 276, the reluctance ratio, $R_{Ng}/R_{Ig}$, needs to increase by a factor of between 5 to 10. The reluctance ratio, $R_{Ng}/R_{Ig}$, can be increased by:

A. increasing the ratio of the no-winding gap length 242/inductor gap length 246, and/or B. decreasing the ratio of the no-winding gap area 250/the inductor gap area 220.

(In some embodiments, the ratio of the no-winding gap area 250 to the no-winding gap length 242 is smaller than the ratio of the inductor gap area 220 to the inductor gap length 246.

Both these objectives are difficult to achieve using the current manufacturing methods and materials. In particular, it is difficult to reduce the no-winding gap area 250 to an area size needed to obtain the needed flux splitting 210.

It is noted that while the gap lengths can be increased to increase the gap reluctance, as air gap length become larger, magnetic fields cease to be well contained within the gap due to fringe affects. This can cause undesirable magnetic saturation at sharp edges and corners of the gap surfaces. Therefore, there are constraints on adjusting gap lengths to obtain the desired reluctance differences in the flux paths.

Figure 4:
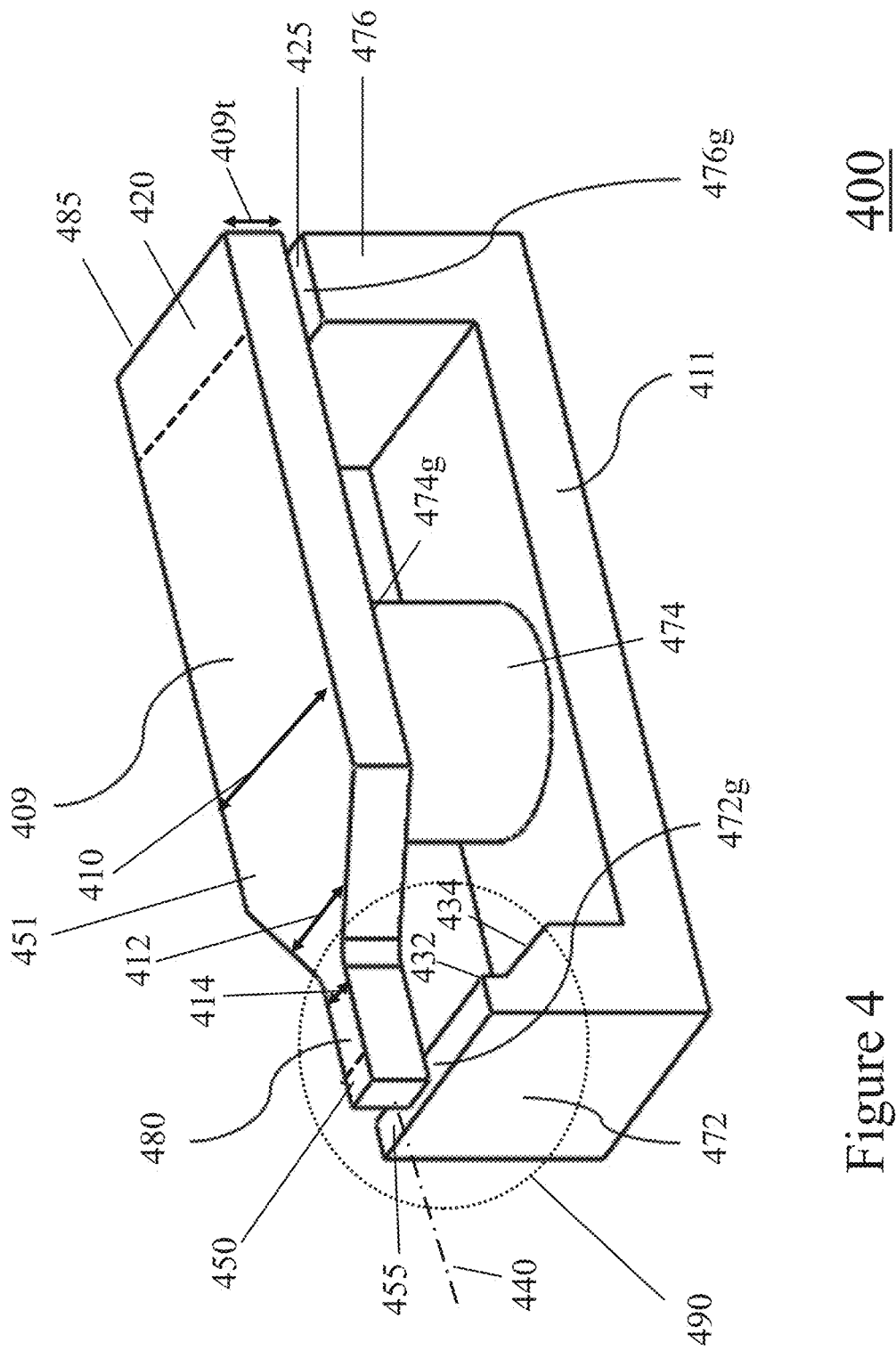
FIG. 4 is an isometric diagram of one embodiment of a core with an elongated plate and an offset beveled no-winding leg forming the no-winding gap.

Refer to FIG. 4.

FIG. 4 is an isometric diagram of one embodiment of a core 400 with an elongated plate 409, e.g., an oblong plate shape 451, and an offset 432 beveled 434 no-winding leg 472 forming the no-winding leg 472 gap 472g.

In this embodiment, the E-core 411/472/472/176 has a transformer leg 474 and an inductor leg 476 with an inductor gap 476g. (Note that the transformer leg/center post 474 is shown as a cylinder, however, other shapes with other than circular cross sections are envisioned. For example, transformer legs 474 with other than circular cross sections can be easier to manufacture.)

The E-core 111/172/174/176 (or alternatively 411/472/474/476) is made of the no-winding leg 472/172, the transformer leg 474/174, the inductor leg 476/176, and the base 411/111. The inductor gap 476g has an inductor gap area 420 defined by the vertical projection 420 of the top surface 425 of the inductor leg 476 on the inductor end 485 of the plate 409. The inductor gap area 420 of the inductor gap 476g is larger than the no-winding leg 472 gap 472g area 450. According, for when the gap lengths of the of the inductor gap 476g and the no-winding gap 472g are the same, the inductor gap reluctance of the inductor gap 476g will be lower than the no-winding gap reluctance of the no-winding gap 472g. Therefore, the total reluctance, $R_N$, around the no-winding flux path 232 and will be larger than the total reluctance, $R_I$, around the inductor flux path 236. In this embodiment, there is no transformer leg 474 gap 474g.

The flux path 232/236 reluctance difference can he increased further by making the no-winding gap 472g length larger and/or making the inductor gap 476g length smaller, subject to the constraints discussed above. This can be done by adding a ferromagnetic material in the inductor gap 476g, e.g., by making the inductor leg 476 longer and/or making the plate 409 thicker in the inductor gap 472g area 420. In addition, the no-winding leg 472 can be made shorter and/or material can be removed from the elongated end 480 of the plate 409.

In some embodiments, the width of the plate 409 is tapered moving towards the no-winding end 480 of the plate 409 forming a plate nose 480. In other words, the plate 409 has a wider width 410 at the mid-point and plate end 185 of the plate 409, tapering to a narrow width 412, and eventually to the narrowest width 414 at the no-winding end/nose 480 where the plate overlaps the top surface 455 of the no-winding leg 472. In alternative embodiments, e.g., plate 109, the no-winding end 180 of the plate 109 protrudes without tapering. Other plate shapes 451 are envisioned.

The plate 409 has one or more lateral dimensions 410/412/414 larger than the plate 409 thickness 409t.

The no-winding 472 gap 472g area 450 can be reduced in many ways. As the plate 409 tapers, the width of the plate becomes narrower and the gap 472g area 450 is reduced at the no-winding end/nose 480. In addition, the surface of the top 455 of the no-winding leg 472 is reduced because of the bevel 434. In this embodiment, the bevel 434 of the no-winding leg 472 is off-set 432 away from the plate 409 to reduce fringe effects of the flux, $\phi_N$, through the no-winding gap 472g.

The plate 409, as shown in FIG. 4 has a center line 440 that is centered over the no-winding leg 472. Embodiments are envisioned where the plate 409 no-winding end/nose 480 is not centered but off-set at different amount either to the left or right of the center of the no-winding leg 472.

The smaller dimension, e.g., width 414, of the tapered no-winding end/nose 480 of the plate 409 that creates the no-winding gap 472g forms the no-winding gap 472g that is smaller in gap area 450 than the gap area 420 of the inductor gap 476g. As a result, the reluctance, $R_{Ng}$, of the no-winding gap 472g is higher than the reluctance, $R_{Ig}$, of the inductor gap 476g, with other parameters being unchanged. Thus, there is an increase of the flux split 210 to favor the inductor leg flux $\phi_I$, 276, since the reluctance ratio, $R_{Ng}/R_{Ig}$, has increased.

As shown above, in some embodiments, the reluctance ratio, $R_{Ng}/R_{Ig}$, has to be high to achieve the lower output voltages, $V_L$, 140P and higher output currents, Iout, 140I. Given the structures disclosed, the gap reluctance ratio, $R_{Ng}/R_{Ig}$, can be increased to the practical manufacturing limits to achieve these goals.

For example, for some geometries, arranging the center line/symmetry axis 440 of the plate 409 perpendicular to the no-winding leg 472 results in a minimum overlapping area 450 between the plate 409 no-winding end/nose 480 and the top surface 455 of the no-winding leg 472 resulting in a maximum no-winding gap 472g reluctance, $R_{Ng}$, that can be achieved for a given gap distance 172g between the materials.

The smaller dimensions need only occur in region 490, near the no-winding gap 472g. Other dimensions of the E-core 472/474/476/411 and plate 409 can remain those dimensions used in the prior art without the need for any manufacturing changes.

Other embodiments of plates 409 and no-winding legs 472 are shown/described in FIGS. 5-10. However, for clarity, only the no-winding end 480 region 490 is shown in these Figures without loss of generality.

Figure 5:
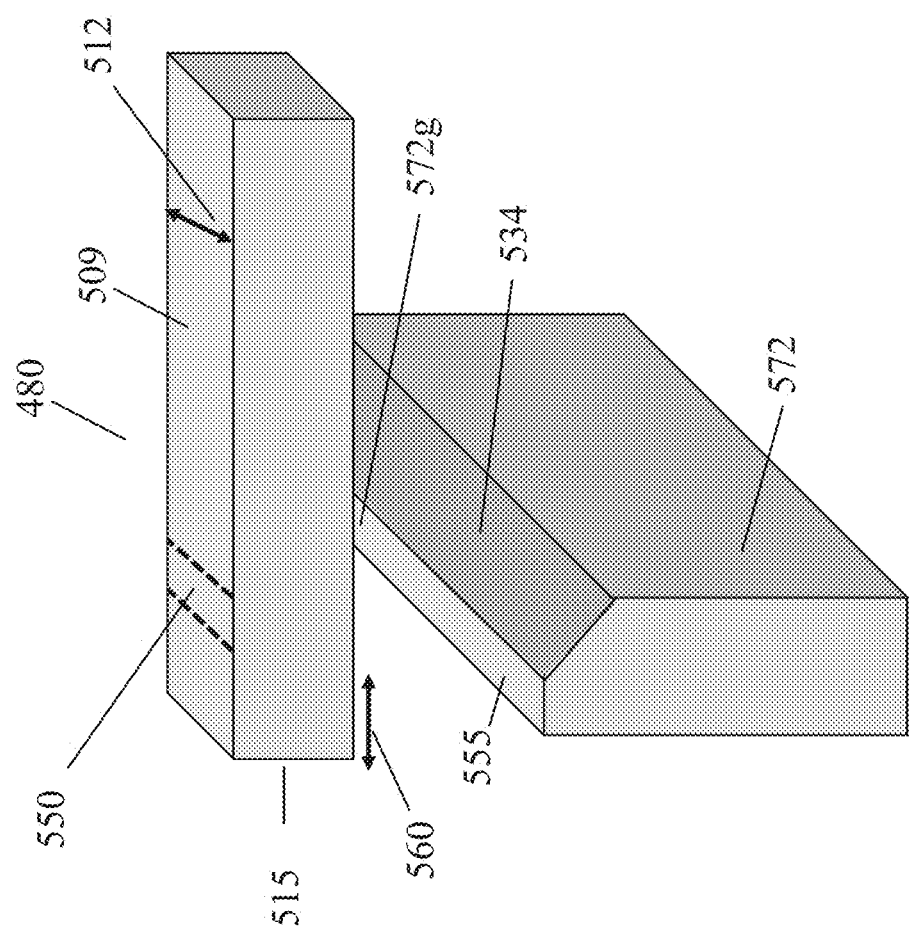
FIG. 5 is an isometric diagram of one embodiment of a plate nose and a no-winding leg with a no-winding gap, where the plate nose extends past the no-winding leg which has an interior bevel without off-set.

FIG. 5 is an isometric diagram of one embodiment 500 of a plate nose 515 and a no-winding leg 572 with a no-winding gap 572g, where the plate nose 515 extends beyond the no-winding leg 572 and the no-winding leg 572 has an interior bevel 534 without off-set.

Positioning of no-winding end 480 of the plate 509, e.g., the plate nose 515, can extend an extension distance 560 past the no-winding leg 572. The longer extension distance 560 of the plate nose 515 allows a larger tolerance when positioning the plate 509 over the no-winding leg 572.

The gap area 550 is reduced by the small width 512 of the plate nose 515 in combination with the reduced area of the top surface 555 of the beveled top of the no-winding leg 572. In this embodiment, there is no offset in the beveled surface 534, which may cause some fringe flux effects in the no-winding gap 572g. However, this fringe effects might be neglected in some embodiments, and this embodiment having a bevel 534 without an off-set can have some manufacturing advantages.

Figure 6:
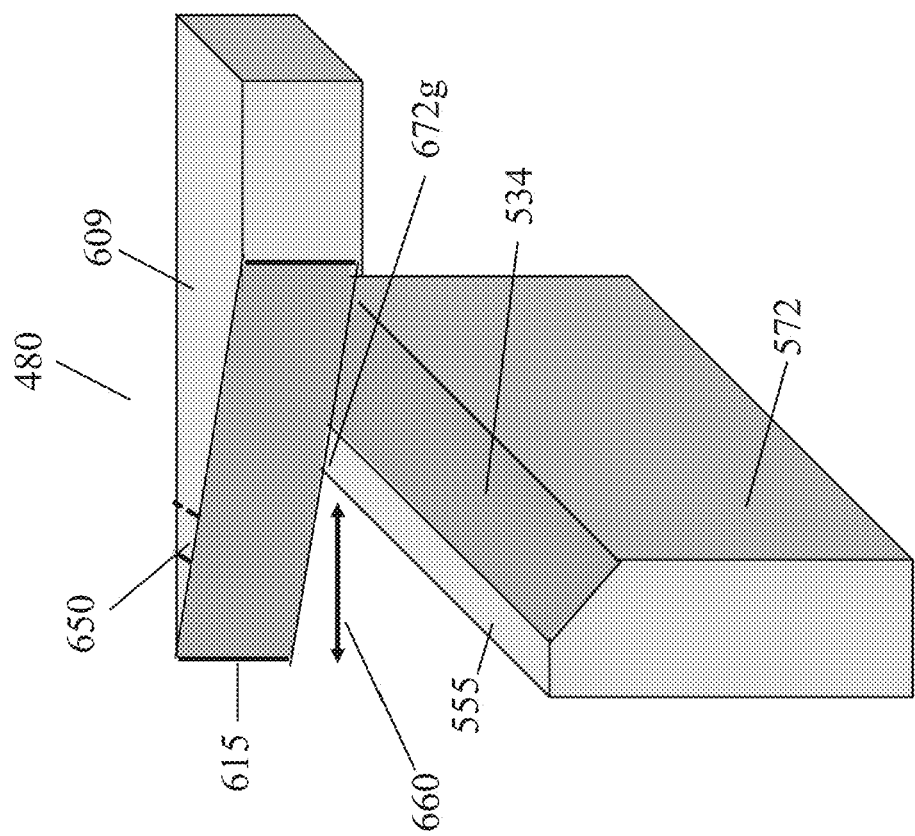
FIG. 6 is an isometric diagram of one embodiment of a pointed plate nose extending beyond the no-winding leg.

FIG. 6 is an isometric diagram of one embodiment 600 of a pointed plate 609 nose 615 extending 660 beyond the no-winding leg 572. As before, the no-winding leg 572 has the no-winding gap 672g and the interior bevel 534 without an off-set with a small top surface 555.

An advantage of this embodiment is that the gap area 650 can be adjusted by the amount of extension 660. For example, as the gap area 650 overlap is closer to the point of the plate 609 nose 615, or the plate 609 nose 615 extension 660 becomes shorter, the gap area 650 becomes smaller. A disadvantage of this embodiment is that the sharper dimensions created by the pointed nose 615 can increase flux fringing. As an alternative, the pointed nose 615 can be rounded.

Figure 7:
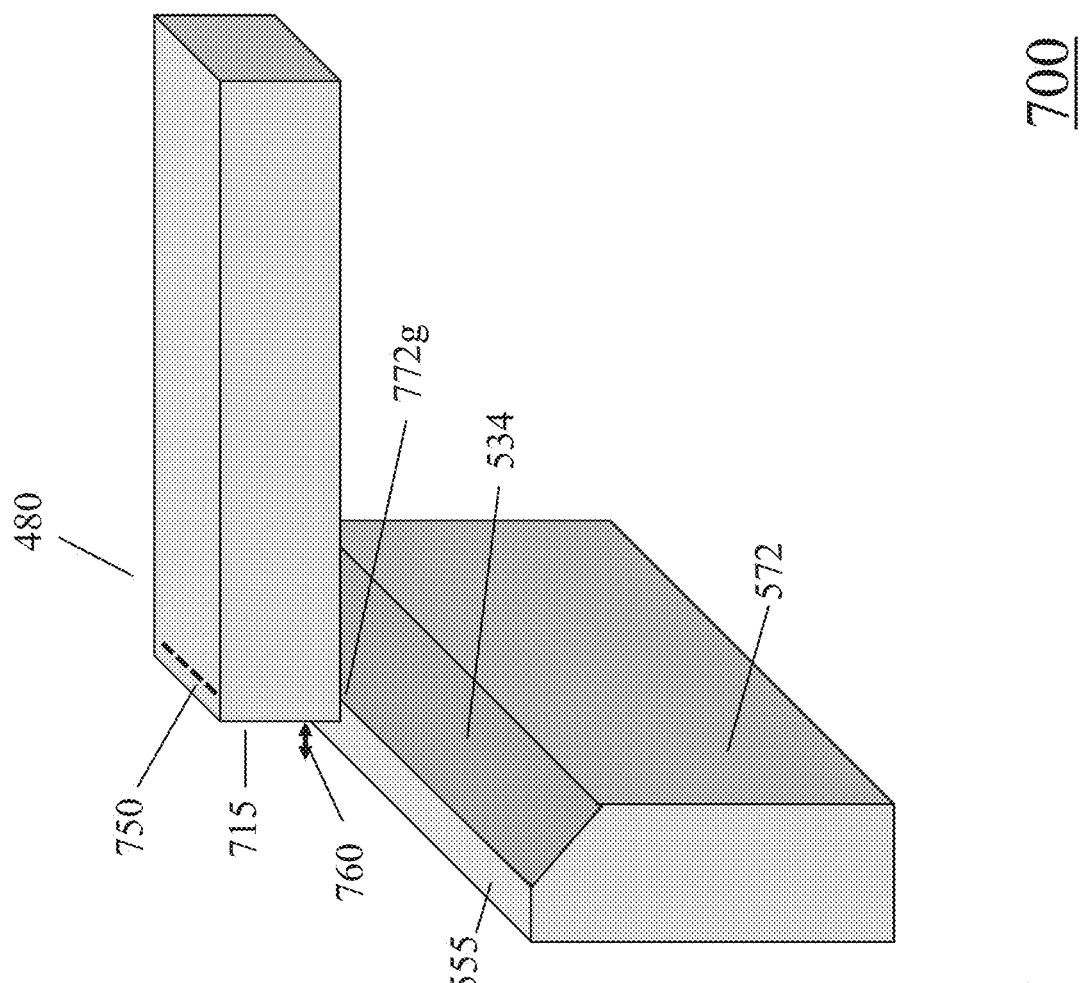
FIG. 7 is an isometric diagram of one embodiment of a squared or flattened plate nose and a no-winding leg, where the plate nose does not extend past the top surface of the no-winding leg.

FIG. 7 is an isometric diagram of one embodiment 700 of a squared or flattened plate nose 715 and a no-winding leg 572 with a no-winding gap 772g where the plate nose 715 does not extend 760 past the top surface 555 of the no-winding leg 572, e.g., there is a partial overlap. The no-winding leg 572 has an interior bevel 534 without off-set. In this embodiment 700, the gap area 750 can be reduced by reducing the amount of the plate nose 715 overlapping the no-winding leg top surface 555. A disadvantage of this embodiment is the difficulty controlling the amount 760 that the plate nose 715 overlaps the no-winding leg top surface 555.

Figure 8:
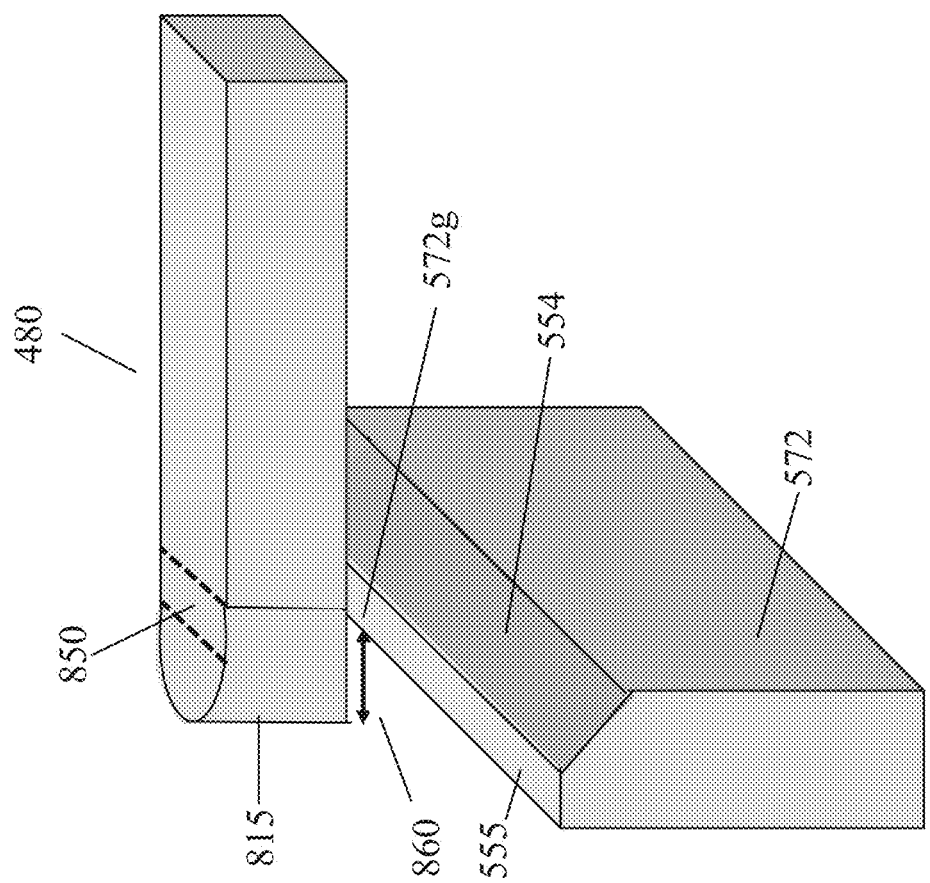
FIG. 8 is an isometric diagram of one embodiment of a rounded nose and a no-winding leg where the rounded plate nose extends past the top surface of the no-winding leg.

FIG. 8 is an isometric diagram of one embodiment 800 of a rounded nose 815 and a no-winding leg 572 with a no-winding gap 572g where a rounded plate nose 815 extends 860 past the top surface 555 of the no-winding leg 572. The no-winding leg 572 has an interior bevel 554 without off-set. The rounded plate nose 815 reduces flux fringing.

Figure 9:
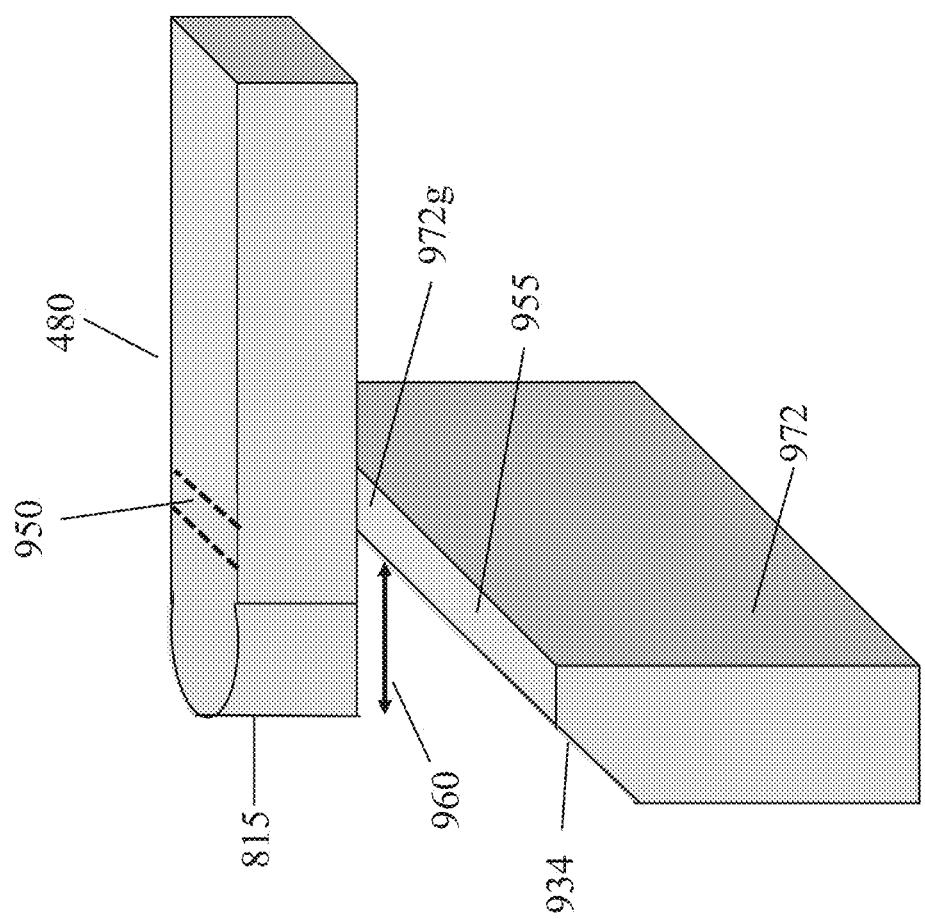
FIG. 9 is an isometric diagram of one embodiment of a rounded plate nose and a no-winding leg where the rounded plate nose extends past the top surface of the no-winding leg which has an exterior bevel without off-set.

FIG. 9 is an isometric diagram of one embodiment 900 of a rounded nose 815 and a no-winding leg 972 with a no-winding gap 972g where a rounded plate nose 815 extends 960 past the top surface 955 of the no-winding leg 972 which has an exterior bevel 934 without off-set. The gap surface 950 shifts more toward the center of the E-core in this embodiment. There may be some manufacturing advantages of putting the bevel 934 facing the exterior side of the no-winding leg 972.

Figure 10:
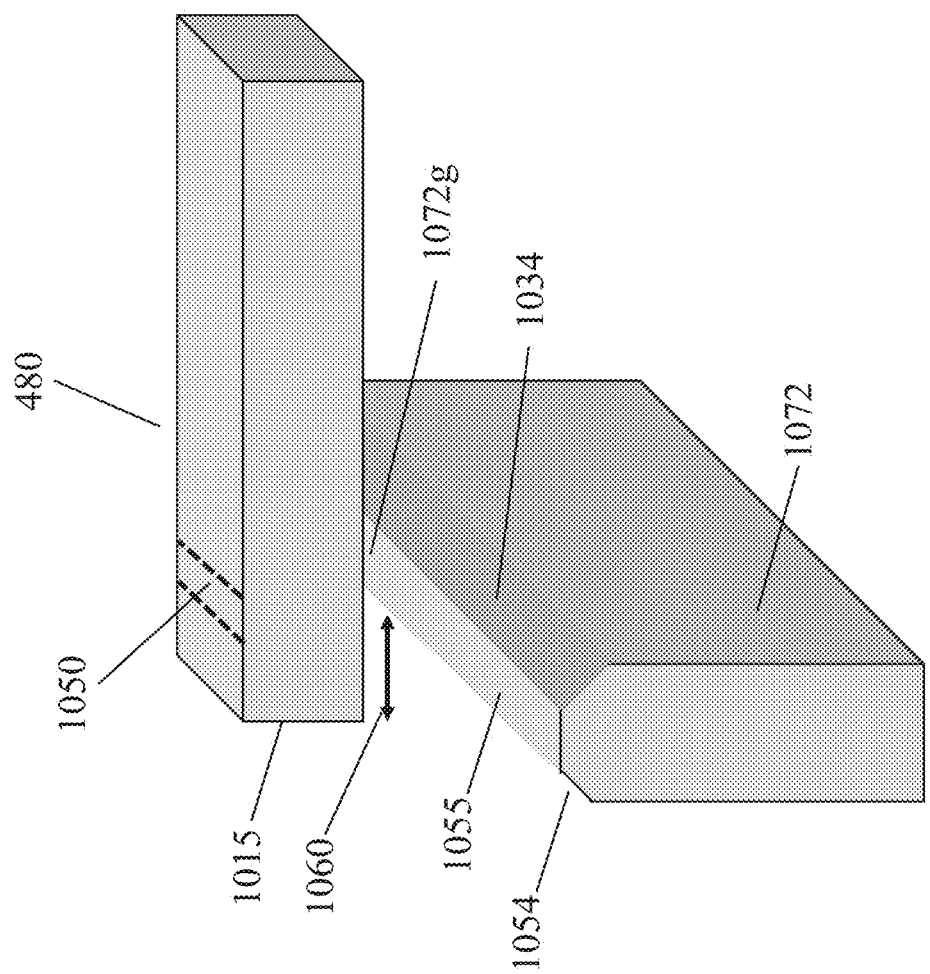
FIG. 10 is an isometric diagram of one embodiment of a squared or flattened plate nose and a no-winding leg with a no-winding gap where the plate nose extends past the top surface of the no-winding leg which has a double bevel without off-set.

FIG. 10 is an isometric diagram of one embodiment 1000 of a squared or flattened plate nose 1015 and a no-winding 1072 with a no-winding gap 1072g where the plate nose 1015 extends 1060 past the top surface 1055 of the no-winding leg 1072 which has a double bevel 1034/1054 without off-set. The gap surface 1050 is shifted more toward the center line of the no-winding leg 1072 in this embodiment.

Figure 11:
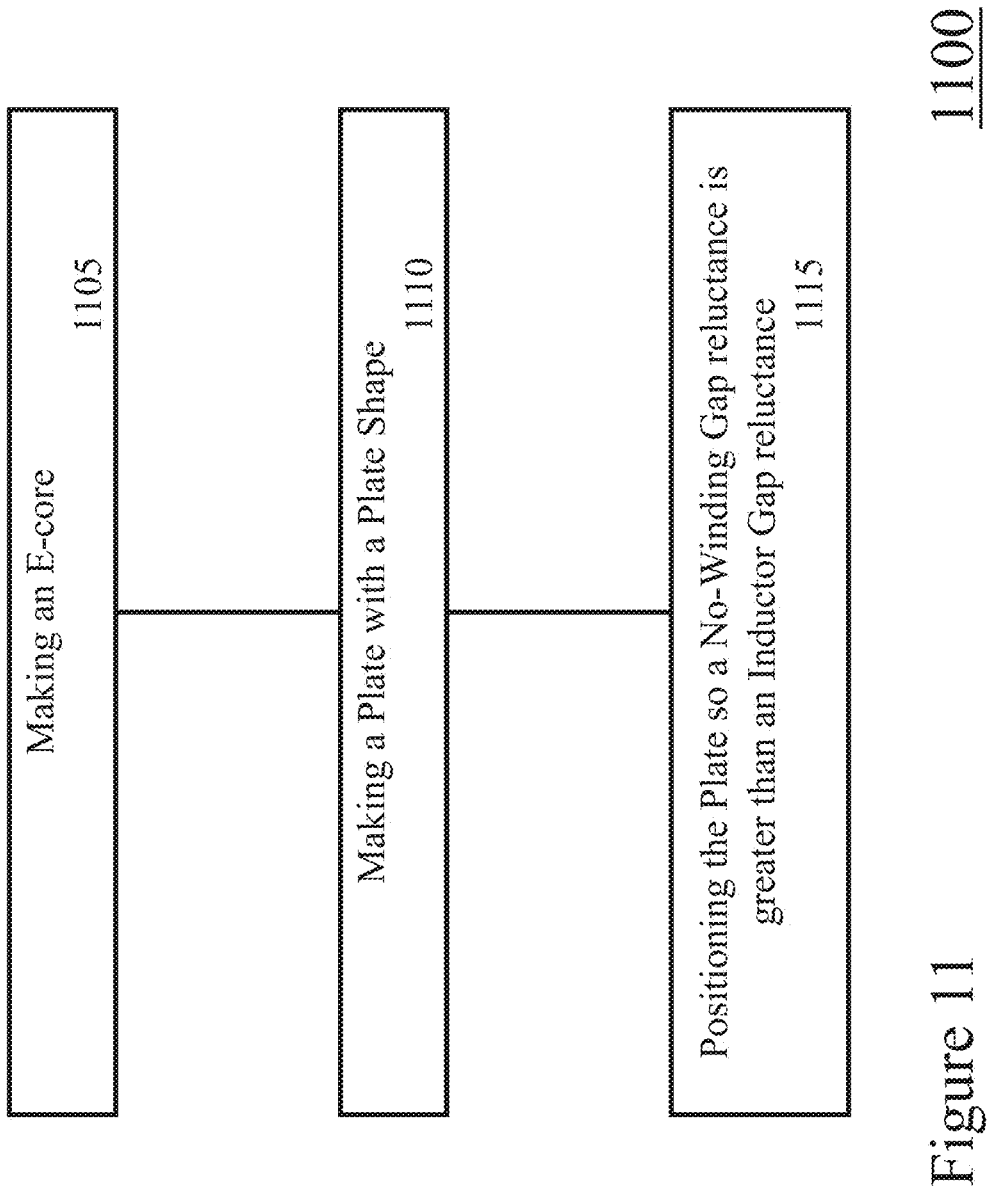
FIG. 11 is a flow chart of a process of manufacturing a core that can convert a higher DC input voltage/lower DC input current into a lower DC output voltage/high DC output current.

FIG. 11 is a flow chart of a process 1100 of manufacturing a core that can convert a higher DC input voltage/lower DC input current into a lower DC output voltage/high DC output current.

The process starts with step 1105 which is manufacturing the E-core 172/174/176/111 with a no-winding leg 172 and any of the embodiments disclosed above. Other embodiments of the no-winding leg 172 are envisioned that are consistent making the reluctance ratios discussed above.

The E-cores can be machined or cast by techniques known in the art.

In step 1110 the plate 109/409/509/609/ (or other embodiments disclosed) is manufactured, e.g., by machining or casting with a plate shape 451 that has a narrower nose 480/515/615/715/815/1015 than end 485.

In step 1115 the plate is positioned to create the no-winding gap and the inductor gap to establish the desired no-winding gap reluctance and inductor gap reluctance. Creation of the gaps can be aided by inserting the non-magnetic materials disclosed above in the gap spaces.

Figure 12:
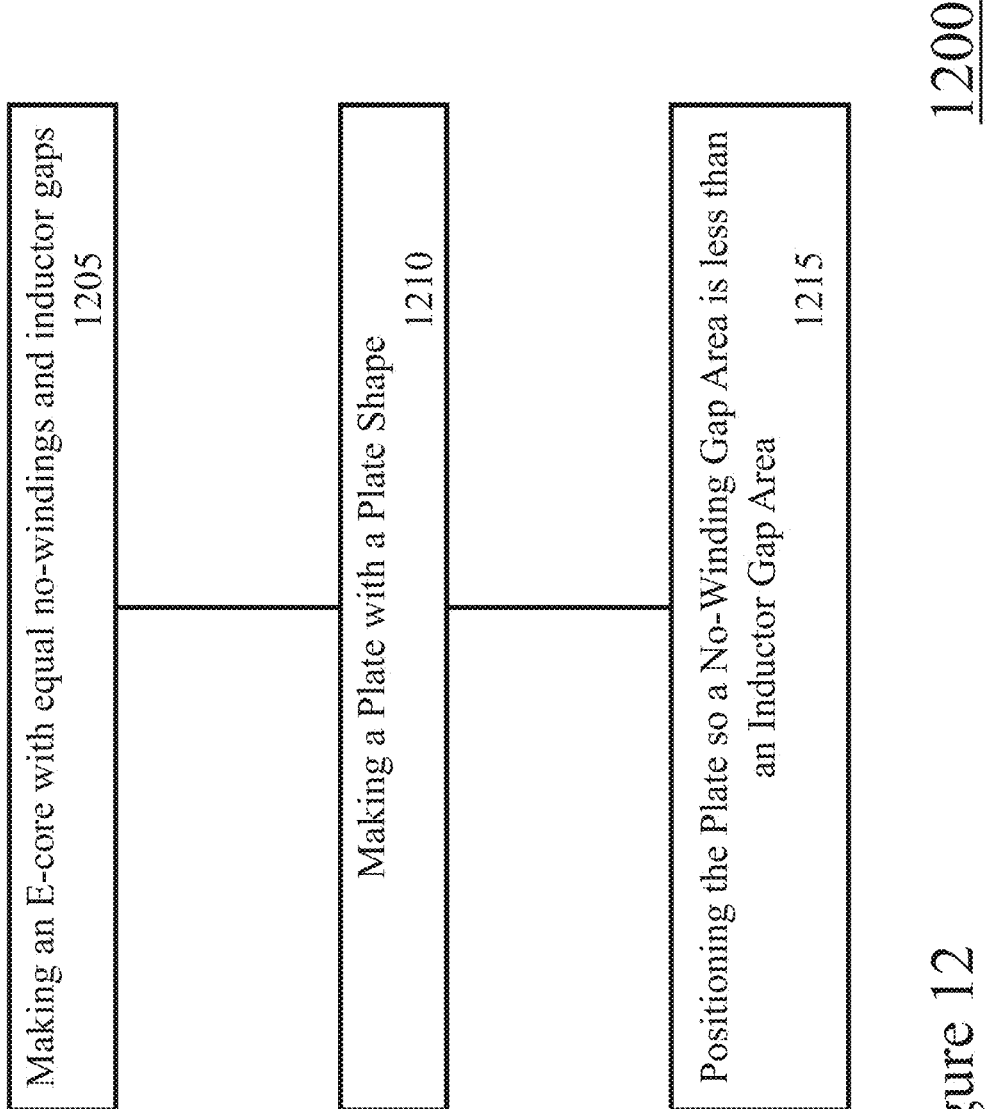
FIG. 12 is a flow chart of a process of manufacturing a core, for the case when the no-winding and inductor magnetic gap lengths are equal.

FIG. 12 is a flow chart of the steps 1200 for producing an E-core 110 and plate 109 with a plate shape in any one of the embodiments disclosed or contemplated by this description, e.g., where the plate shape has a narrower width at the no-winding core end 180 than at the inductor core end 185 and where the gap lengths, e.g., 242/246, are equal.

In step 1205, the E-core, e.g., 110, which any one of the embodiments disclosed or envisioned above is make. In these embodiments, the no-winding gap length, e.g., 242 and he inductor gap length, e.g., 246, are equal. This can be accomplished by placing the non-magnectic material with equal thicknesses on both the no-winding top post end 172T and the inductor top post end 176T.

In step 1210 the plate 109/with the plate shape 451 is made. Since the no-winding gap length 242 and the inductor gap length 246 are equal, the no-winding gap 172g reluctance, $R_{Ng}$, is kept larger than the inductor gap reluctance, $R_{Ig}$, by designing the no-winding gap 172g area 250 to be smaller than the inductor gap 176g area 220. In some embodiments, this is accomplished by making the plate 109 have a plate shape 451 that is typically oblong. An oblong plate shape 451 has a narrower nose 480/515/615/715/815/1015 overlapping the no-winding leg 472 than end 485 overlapping the inductor leg 476. While modifications can also be made to the no-winding leg, e.g., 472, shaping the plate 109 alone has manufacturing advantages. Embodiments are contemplated that have an oblong 451 plate 109 shape 451 and/or a modified no-winding leg 472 (e.g., with a bevel or two).

In step 1215, the plate 109 is positioned so that the no-winding gap 172area 250 is less than the inductor gap 176g area 220, as described in FIGS. 5-10 as non-limiting examples.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Devices, components, elements, features, apparatus, systems, techniques, and methods described with different terminology that perform substantially the same function, work in the substantial the same way, have substantially the same use, and/or perform the similar steps are contemplated as embodiments of this invention.

We claim:

1. A magnetic structure comprising:
   an E-core, the E-core comprising a base, a no-winding leg, a transformer leg, and an inductor leg, the no-winding leg, the transformer leg, and the inductor leg being perpendicular and magnetically in contact with the base, the no-winding leg being on a no-winding core end of the E-core, and the inductor leg being on an inductor core end of the E-core, the base, no-winding leg, transformer leg, and inductor leg being made from a first magnetic material with high relative magnetic permeability, and the no-winding leg having a no-winding top post end, the transformer leg having a transformer top post end, and the inductor leg having an inductor top post end, the no-winding top post end, the transformer top post end, and the inductor top post end being opposite the base;
   a plate made from a second magnetic material with high relative magnetic permeability, the plate having a plate shape with one or more lateral dimensions larger than a plate thickness, the plate located adjacent to the no-winding leg top post end, transformer leg top post end, and inductor leg top post end, the plate having one or more lateral dimensions larger than the plate thickness, the plate shape having a plate nose overlapping a top no-winding leg surface of the no-winding top post end with a no-winding gap area and a plate end overlapping a top inductor leg surface of the inductor top post end with an inductor gap area;
   a no-winding gap being a no-winding separation between the plate nose and the top no-winding leg surface, the no-winding gap having a no-winding gap length, the no-winding gap being filled with a first nonmagnetic material having a relative magnetic permeability close to one, the no-winding gap having a no-winding gap reluctance;
   an inductor gap being an inductor separation between the plate end and the top inductor leg surface, the inductor gap having an inductor gap length, the inductor gap being filled with a second nonmagnetic material having a relative magnetic permeability close to one, the inductor gap having an inductor gap reluctance;
   a transformer flux path passing through the transformer leg;
   a no-winding flux path passing through the plate nose, the no-winding gap, the no-winding leg, and the base, the no-winding flux path having a no-winding flux path reluctance, the no-winding gap reluctance being a major part of the no-winding flux path reluctance;
   an inductor flux path passing through the plate end, the inductor gap, inductor leg, and the base, the inductor flux path having an inductor flux path reluctance, the inductor gap reluctance being a major part of the inductor flux path,
   wherein the no-winding gap reluctance is larger than the inductor gap reluctance.

2. The structure, as in claim 1, further comprising a transformer gap being a transformer separation between the plate and a top transformer leg surface at the transformer top post end, the transformer gap having a transformer gap length, the transformer gap being filled with a nonmagnetic material having a relative magnetic permeability close to one.

3. The structure, as in claim 1, where the first magnetic material and the second magnetic material each is made of one or more of the following: ferrite, powdered iron, iron, nickel, cobalt, and alloys or composites made from or containing of one or more of iron, nickel and cobalt.

4. structure, as in claim 1, where the first nonmagnetic material and the second nonmagnetic material each is made of one of the following: air, a polymer mixed with an epoxy, plastic, paper, glue, tape and nonferromagnetic metals.

5. The structure, as in claim 1, wherein a flux ratio, $\phi_I/\phi_T$, of the amount of an inductor flux, $\phi_I$, flowing through the inductor leg to the amount of transformer flux, $\phi_T$, flowing through the transformer leg, is greater than 55% when the structure is operating.

6. The structure, as in claim 1, where the no-winding gap length is greater than the inductor gap length.

7. The structure, as in claim 1, where the no-winding gap length and the inductor gap length are the same.

8. The structure, as in claim 1, where the no-winding gap area is less than the inductor gap area.

9. The structure, as in claim 1, where a plate nose width of the plate nose at the no-winding core end is narrower than a plate end width at the plate end.

10. The structure, as in claim 1, where the plate shape is oblong like.

11. The structure, as in claim 1, where a center line of the plate is perpendicular to the no-winding leg.

12. The structure, as in claim 1, where the nose has one of the following shapes: a square end, a flat end, a rounded end, and a pointed end.

13. The structure, as in claim 1, where the top no-winding leg surface has one of the following shapes: an off-set bevel, an interior bevel, an exterior bevel, and a double bevel.

14. The structure, as in claim 1, where the plate nose overlaps the top no-winding leg surface in one of the following ways: an overlap past the no-winding leg and a partial overlap of the no-winding leg.

15. A direct current (DC) voltage to DC voltage converter comprising;
   a magnetic structure comprising:
   an E-core, the E-core comprising a base, a no-winding leg, a transformer leg, and an inductor leg, the no-winding leg, the transformer leg, and the inductor leg being perpendicular and magnetically in contact with the base, the no-winding leg being on a no-winding core end of the E-core, and the inductor leg being on an inductor core end of the E-core, the base, no-winding leg, transformer leg, and inductor leg being made from a magnetic material with high relative magnetic permeability, and the no-winding leg having a no-winding top post end, the transformer leg having a transformer top post end, and the inductor leg having an inductor top post end, the no-winding top post end, the transformer top post end, and the inductor top post end being opposite the base;

a plate made from a magnetic material with high relative magnetic permeability, the plate having a plate shape with one or more lateral dimensions larger than a plate thickness, the plate being adjacent to the no-winding leg top post end, transformer leg top post end, and inductor leg top post end, the plate having one or more lateral dimensions larger than the plate thickness, the plate shape having a plate nose overlapping a top no-winding leg surface of the no-winding top post end with a no-winding gap area and a plate end overlapping a top inductor leg surface of the inductor top post end with an inductor gap area;

a no-winding gap being a no-winding separation between the plate nose and the top no-winding leg surface, the no-winding gap having a no-winding gap length, the no-winding gap being filled with a nonmagnetic material having a relative magnetic permeability close to one, the no-winding gap having a no-winding gap reluctance;

an inductor gap being an inductor separation between the plate end and the top inductor leg surface, the inductor gap having an inductor gap length, the inductor gap being filled with a nonmagnetic material having a relative magnetic permeability close to one, the inductor gap having an inductor gap reluctance;

a transformer flux path passing through the transformer leg;

a no-winding flux path passing through the plate nose, the no-winding gap, the no-winding leg, and the base, the no-winding flux path having a no-winding flux path reluctance, the no-winding gap reluctance being a major part of the no-winding flux path reluctance;

an inductor flux path passing through the plate end, the inductor gap, inductor leg, and the base, the inductor flux path having an inductor flux path reluctance, the inductor gap reluctance being a major part of the inductor flux path, where a transformer flux passing through the transformer flux path splits into a no-winding flux passing through the no-winding flux path and an inductor flux passing through the inductor flux path;

a primary coil with a primary coil number of turns enclosing the transformer leg, the primary coil wound with a primary coil polarity;

a secondary coil with a secondary coil number of turns enclosing the transformer leg, the secondary coil wound with a secondary coil polarity, the secondary coil polarity being opposite than the primary coil polarity;

an inductor coil with an inductor coil number of turns enclosing the inductor leg, a second end of the secondary coil connected in a common connection with a first end of the inductor coil, the inductor coil wound with an inductor coil polarity, the inductor coil polarity being opposite the secondary coil polarity, wherein for a common current path passing through the secondary coil connected in series with the inductor coil, for a magnetic flux loop passing through the transformer flux path and returning through a parallel combination of the no-winding and inductor flux paths, a time rate of change of the magnetic flux in the magnetic flux loop will cause charge passing through the common current path to experience an electromotive force of one polarity when passing through the secondary coil and an electromotive force of the opposite polarity when passing through the inductor coil in the same direction of current flow;

an input switching circuit that connects the primary coil in parallel with an input voltage source during an on portion of an operating period and connects the primary coil in series with a reset capacitor during an off portion of the operating period;

an output switching circuit that connects the secondary coil and inductor coil so that a secondary current flows in the secondary coil and an inductor current flows in the inductor coil during the on portion of the operating period and only the inductor current flows during the off portion of the operating period;

a ratio of inductor gap reluctance to no-winding gap reluctance that causes flux passing through the transformer flux path to divide in a defined ratio and return partially though the no-winding flux path and partially through the inductor flux path;

wherein the duty cycle of the switching circuits can be adjusted so that the average voltage of a load connected to the output end of the power converter's inductor coil will be equal to the net electromotive force applied by the transformer secondary and inductor coils to current returning from the load, passing through the power converter and being resupplied to the load, thereby resulting in little net voltage being applied across the power converter's inductor coil throughout the operating cycle, little change in current passing through the inductor coil and little output current ripple when the voltage converter operates in steady state at this load voltage.

16. The converter, as in claim 15, wherein the turns ratio is one of the following: 1:4, 1:8, 1:12, 1:24, and 1:32.

17. The converter, as in claim 15, where the turns ratio is less than one, resulting in a secondary coil voltage and the output voltage, which are both lower than the input voltage.

18. The converter, as in claim 17, where the duty cycle is adjusted to provide the output voltage of less than 1 V.

19. A method of making a direct current (DC) voltage to DC voltage converter comprising the steps of:

making an E-core, the E-core comprising a base, a no-winding leg, a transformer leg, and an inductor leg, the no-winding leg, the transformer leg, and the inductor leg being perpendicular and magnetically in contact with the base, the no-winding leg being on a no-winding core end of the E-core, and the inductor leg being a inductor core end of the E-core, the base, no-winding leg, transformer leg, and inductor leg being made from a magnetic material having a high relative magnetic permeability, the no-winding leg having a no-winding leg top post end, the transformer leg having a transformer leg top post end, and the inductor leg having an inductor leg top post end, the no-winding leg top post end, the transformer leg top post end, and the inductor leg top post end being opposite from the base;

positioning a plate made from a magnetic material with a high relative magnetic permeability adjacent to the no-winding leg top post end, the transformer leg top post end, and the inductor leg top post end, the plate having one or more lateral dimensions larger than a plate thickness, the plate shape having a plate nose overlapping a top no-winding leg surface of the no-winding leg with a no-winding gap area and a plate end overlapping a top inductor leg surface of the inductor leg with an inductor gap area, wherein the ratio of the no-winding gap area to the no-winding gap length is smaller than the ratio of the inductor gap area to the inductor gap length.

20. The method, as in claim 19, where the plate nose has one of the following shapes: a square end, a flat end; a rounded end, and a pointed end.

* * * * *